(12) United States Patent
Sines et al.

(10) Patent No.: US 7,599,862 B2
(45) Date of Patent: *Oct. 6, 2009

(54) TRANSFERRING FUNDS IN CONNECTION WITH INTERNET ORDERS USING ORDER VARIABLES FROM TWO SOURCES AND AUTHENTICATION

(75) Inventors: Randy D. Sines, Spokane, WA (US); Randy A. Gregory, Spokane, WA (US)

(73) Assignee: eCardless Bancorp, Ltd., Spokane, WA (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/324,832

(22) Filed: Jan. 3, 2006

(65) Prior Publication Data

US 2006/0184428 A1 Aug. 17, 2006

Related U.S. Application Data

(63) Continuation of application No. 09/669,335, filed on Sep. 25, 2000, now Pat. No. 7,006,986.

(51) Int. Cl.
 *G06Q 30/00* (2006.01)
(52) U.S. Cl. .............. 705/26; 705/1; 705/27; 705/35; 705/37; 705/50; 705/51; 705/64; 235/375; 235/379; 235/380; 235/462.01

(58) Field of Classification Search ............ 705/1, 705/26, 27, 35, 37, 50, 51, 64; 235/375, 235/462.01, 379, 380
See application file for complete search history.

(56) References Cited

U.S. PATENT DOCUMENTS

| 5,883,810 | A  | * | 3/1999  | Franklin et al. | 700/232 |
| 6,070,798 | A  | * | 6/2000  | Nethery | 235/462.01 |
| 6,816,843 | B1 | * | 11/2004 | Baughman | 705/64 |
| 6,947,908 | B1 | * | 9/2005  | Slater | 705/51 |
| 7,373,322 | B1 | * | 5/2008  | Patterson et al. | 705/35 |

* cited by examiner

*Primary Examiner*—Yogesh C Garg
(74) *Attorney, Agent, or Firm*—Gregory IPL, P.C.; Randy A. Gregory

(57) ABSTRACT

Methods for purchasing of goods or services over the internet. A customer has a customer account set up at a bank with associated account information. The account information includes verification information for verification parameters, such as authorized computer identification, authorized delivery addresses, authorized user identification, authorized telephone caller identification, and/or other account information. An order is placed by a user via an ordering computer which provides order information. Such order information includes verification variables used by the bank. Verification and/or authentication using one or more variables of the customer account information is used by the bank to validate the order before assuring payment to the merchant.

20 Claims, 7 Drawing Sheets

TRANSFERRING FUNDS IN CONNECTION WITH INTERNET ORDERS USING ORDER VARIABLES FROM TWO SOURCES AND AUTHENTICATION

CROSS-REFERENCES TO RELATED CASES

This is a continuation of U.S. patent application Ser. No. 09/669,335 filed Sep. 25, 2000, now U.S. Pat. No. 7,006,986. Priority under 35 U.S.C. §120 is hereby claimed.

TECHNICAL FIELD

The technical field of this invention is methods and systems for purchasing on the internet or other global computer information network without need for transferring charge card numbers or similar sensitive financial or personal account information during the purchase transaction.

BACKGROUND OF THE INVENTION

Internet Purchase Transactions

The volume of commercial transactions being conducted by communication over the internet has grown dramatically. These transactions typically include placement of orders by purchasers using a merchant or plural merchants who are paid by one or more credit card companies or banks using credit or debit accounts. This trend will continue and the volume of purchase transactions conducted over the internet will increase, probably at an accelerating rate.

A typical internet purchase transaction includes an order which is placed with a merchant. The order information is assembled by the customer, typically using the customer's name. If the customer is a company or other organization, then the order will include both the company name and the name of the person who is using the computer. Such user names are also included to better process the order and provide greater accountability.

The home address, business address, or other mailing and/or billing addresses are frequently required by the merchant during the order session to create an order file. Also included as part of the order information is the shipping or delivery address. If the order is for shipment to a third party, then the shipping or delivery address is different from the customer address.

Order Response Communication

Internet purchasers are also typically invited to provide an email address to which an order response communication can be sent. Alternative order response communications can be used, such as phone, letter or other. The order response communication is most often in the form of a confirmation communication providing the customer with pertinent transaction information and a message which reassures the customer that the order has been successfully communicated and is being processed.

Additional information which may be gathered in connection with an internet purchase may include telephone contact information, purchase order numbers, invoice numbers and additional billing or customer information.

In most internet purchase transactions the order is processed and paid using a bank credit or debit card. The information provided by the customer includes an account number, card expiration date, card holder's name and the type of card being used. The charges for the order are posted against the customer account number as a charge entry or entries. These entries can be either a credit charge entry or a debit charge entry, depending on whether the charge account is a credit card account or a debit card account.

Placement of orders for internet purchasing using charge card accounts is now widely conducted using the limited information just described—account name, account number, and expiration date. This information is available on the face of most charge cards. Because of this, it is relatively easy for a thief using a stolen charge card to purchase items over the internet. The frequency of internet charge card fraud is increasing and the associated costs are also rising. Whether the order is authentic or a fraud is almost impossible to determine unless the charge card has been reported as stolen and been deactivated.

Initial Processing by Merchant

After an internet purchase order is placed, the merchant then undertakes initial processing of the order. Initial processing includes a merchant's review of the requested goods or services to determine whether the order can be properly processed and whether the ordered goods or services can be provided to the purchasing customer. This initial processing varies from one merchant to another.

A common initial processing sequence is for the merchant to first analyze the customer purchase order file to see if all necessary information has been provided. This can be done while the customer is in active communication with the merchant over the internet. Alternatively, the customer order can be checked or double checked after the customer's session with the merchant's web site has been completed. The order file review performed by the merchant checks for completeness to make sure that sufficient information has been provided for the merchant's further review and processing of the customer's order.

The merchant's initial processing of an order usually leads to an initial order response communication. The initial order response communication can be in various forms and is used to communicate results of the initial processing analysis. For example, the initial order response may communicate confirmation of the order, a query for additional information, or a refusal that declines the order or explains some other alternative.

Initial order processing by a merchant may also include inventory review. Such inventory review analysis considers the merchant's inventory of goods or resources available for providing services. This is assessed against previous orders to determine if and when the ordered items can be provided.

Another step or phase of initial processing may include payment assessment. Payment assessment of an internet order is performed to determine whether the customer has adequately arranged for or provided payment for the ordered items. The merchant considers the payment information contained in the order and then decides whether to accept or reject the order on this assessment.

One widespread form of payment assessment involves orders placed using credit or debit cards as the means for payment. The customer provides sensitive charge account information via the internet as explained above. This information is then used by the merchant to determine whether the customer's account can be charged for the ordered items to pay the merchant. The ordered items may be goods, services or a combination of goods and services.

Prior Art Communication of Account Information

The current practice involves not only the communication of sensitive account information between the customer and merchant when the order is initially placed, but also the secondary retransmission of this account information between the merchant and the bank card company. The order is usually accepted by the merchant after receiving charge authorization from credit card companies, such as VISA™, MASTER-CARD™, DISCOVER™, and AMERICAN EXPRESS™, or processing companies working in their behalf or service. The established approach involves two or more transmissions of the customer account name, account number, expiration date of card, and the amount to be charged to the customer's account for the ordered items.

Dishonored Bank Card Account Transactions

Submission of charge requests to the bank card processors for authorization does not necessarily result in a merchant receiving actual payment. Most businesses receive the customer order and submit a request to the bank card processors for authorization to charge a particular customer's account. In some cases this involves two separate queries by the merchant.

In reviewing a charge request, a first analysis is performed by the bank card processor to determine if the account is valid and active. In a second query, the bank card company or another related bank card processor performs a second analysis to determine if the account has sufficient credit or funds. Both of these queries can also be performed in a single request to a single processing operation serving the merchant or charge card company being used.

The bank card processor responds to the merchant's request for authorization at the time of submission of the authorization request. This can be at or near the time the order is placed or the sale transaction is being conducted. The submission of an authorization can also occur at a later time, particularly when the merchant is taking numerous orders at a substantial frequency. Depending upon the merchant's business, an authorization request or requests can also be routinely submitted later. For example, telephone orders can be processed later in the day or next day, and/or prior to shipment of the goods or rendition of the services.

Surprisingly, although a merchant may receive a positive authorization to charge from the charge card processing company, this does not insure the merchant will actually be paid on the transaction. This uncertainty arises because merchants submit their charge card sales to a designated processing bank for payment to the merchant's account. This is usually done in the form of an electronic file which is submitted hours or even days after the authorization request may have been submitted by the merchant, and approved by the bank card processor. The actual requests for payment are submitted usually at the end of the business day, but can be at various times.

Whatever the merchant's practice, there is an inherent delay between the time the request for authorization to charge is approved and the time the merchant makes an actual demand for payment. The demand for payment is made at the time such demand is processed at the merchant's processing bank. Under the terms of the merchant's agreement with the bank card company, the charge may or may not be paid. For example, if other merchants or banks have in the meantime requested payment or advanced cash so that the customer's account has reached its available credit limit or account balance, then the merchant's demand for payment may be dishonored even though it was previously authorized. Depending on the circumstances, the merchant may end up being paid later or never. Merchant's suffering such dishonored charge transactions are dissatisfied since authorization was given to charge against the account. Nonetheless, the terms of the merchant's agreement with the charge card company will be determinative, and many or most card companies have the ability to dishonor a charge if the account exceeds the available credit limit or account balance.

The merchant's decision as a result of the initial processing is most frequently to accept the order. However, the initial processing may be lengthened in some situations because a merchant may await irrevocable payment from the merchant's processing bank before shipment of goods. This can be done to avoid the risk that the charge transaction will be dishonored or paid late. However, it has the disadvantage of increasing the time between order and shipment. This delay to avoid dishonor may end up hurting the merchant's business in a general manner because of negative effects on responsiveness and business volume. This may be incurred to address the problem of dishonored charges.

Order Acceptance by Merchant

For internet purchase transactions, whether the merchant's initial processing response is acceptance, rejection, or request for additional information, a response is usually communicated by the merchant to the customer in a relatively short period of time, usually less than 1-2 days. This initial processing response communication can be done in a number of suitable ways. Most typically, the merchant's initial processing response is communicated by sending an email to the customer.

Although a variety of formats are used for merchant initial processing responses, the responses usually involve sending a confirmation that the order has been received and accepted. An invoice or other transaction control number is usually assigned. The merchant also typically indicates that shipment has or will occur on or about an expected shipping date. Alternatively, the confirmation may state the customer should expect delivery at the delivery address on or about a certain delivery date.

Electronic Commerce Fraud

A substantial amount of effort has already been expended in setting up internet purchase transaction systems. Despite these earlier efforts, there is a continuing and increasing risk of electronic commerce fraud. The problem of internet fraud has been previously approached by creating secure or encrypted network communications techniques. Although the commercial establishments developing and using these techniques espouse confidence to the public, there are common fears that electronic commerce fraud will both escalate in number and become of greater value. The use of secure or encrypted techniques are not effective where the account card or key account information has been stolen and is being used fraudulently. Fraudulent charges may occur for some time before being reported or detected and the account is deactivated.

The internet or possibly other causes have also led to a growing problem of identity theft. This problem can have a devastating effect on the person who has their normal identity stolen. In identity theft, an impostor obtains sensitive personal information, such as social security numbers, bank account numbers, charge account numbers, driver's license numbers and other information having important identification attributes. The victim of identity theft is usually left with a number of overdue accounts having large balances run up by the impostor. The abused accounts are frequently discovered long after the fraudulent activity first began.

In many instances the victim of identity theft has difficulty in clearing their name from the abusive use by the impostor. This has led many such victims to change their names to alleviate the problems of credit record destruction and other effects of the identity theft.

General

Some or all of these problems and other objectives and considerations are addressed by the current invention which is described more fully below. Terminology and information used in this background discussion is also applicable to corresponding aspects of the invention as described below. The reader should also understand that some of the benefits and advantages of the invention are given in this description, whereas others may become apparent later, in light of further use and study of the invention.

BRIEF DESCRIPTION OF THE DRAWINGS

Preferred embodiments of the invention are described herein with the help of accompanying drawings which are now briefly described.

DETAILED DESCRIPTION

Introduction

The current invention has several features, functions and aspects which are explained below. Additional aspects may also be appreciated from the background description given above and the claims presented hereafter.

The invention includes improved methods and associated systems for conducting a purchase transaction over the internet or other widespread or global computer information network or networks. The novel methods for conducting purchase transactions have a number of steps or phases with associated features. Also included are combinations and subcombinations of the enumerated steps, phases and features. The novel methods can be used in connection with a variety of purchase items, including either goods or services, or both, in the same or separate transactions.

In one aspect the preferred methods involve creating a customer account with a financial organization which is a bank, a business akin to a bank, or other similar financial institution functioning as provided for herein. For purposes of convenience, such organizations shall herein be referred to simply as a bank. However, such use of this term should not be interpreted as implying any legal requirements for being called a bank, or implying attributes other than those which are at issue in the methods performed as described herein.

In the methods according to the invention, the bank provides a customer account which is associated with a customer. The bank has a record of the customer account that includes associated customer account information. In some implementations of the invention the customer account is set up prior to any purchase transaction over the internet. In other forms of the invention the customer account is in part created during an initial interaction between the customer and bank, such as via the internet. This is coupled with supplementary set up with the bank wherein the customer supplies additional account information later, or confirms initially provided account information in second or subsequent setup sessions.

Figure 1:
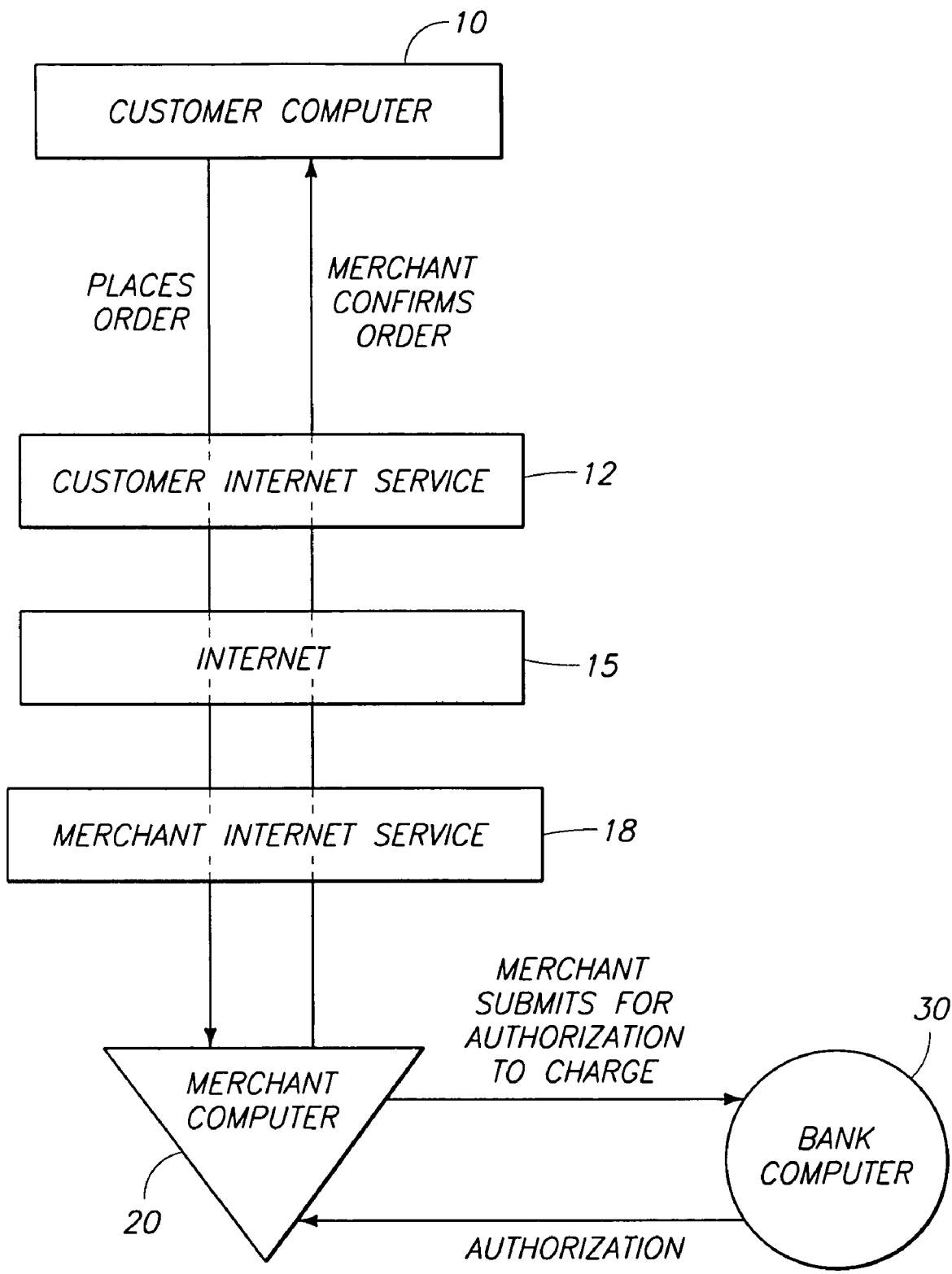
FIG. 1 is a block diagram indicating a prior art equipment arrangement for conducting purchase transactions over the internet. This diagram also shows some of the principal actions indicated by arrows.
Figure 2:
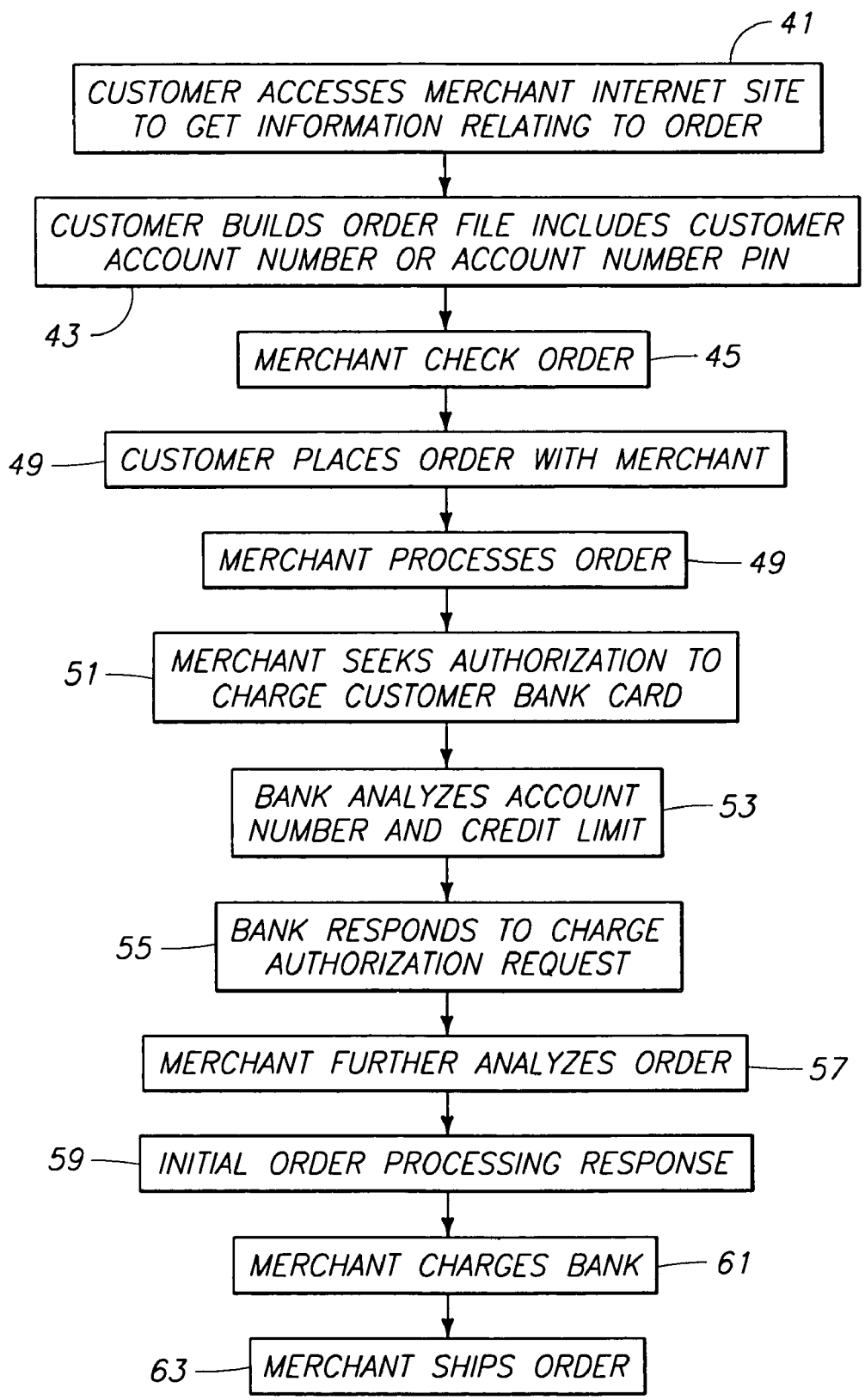
FIG. 2 is a process block diagram indicating processing steps used in prior art internet purchase transactions, such as shown in FIG. 1.

Prior to providing further explanation of the methods according to this invention, the discussion will now turn to a description of a prior art internet purchase transaction with reference to FIGS. 1 and 2.

Prior Art Internet Purchase Transaction

FIG. 1 shows a diagram representing principal equipment and key actions involved in a common internet purchasing transaction. A customer computer 10 is operated by a human user (not illustrated), for example a person using his or her home or office computer. The customer has an internet service provider with data processing equipment 12 that provides service to the customer allowing the customer to communicate over the internet 15 to a large number of internet web sites. The customer accesses web sites of interest in the well-known fashion. One web site is represented by the merchant's internet service provider with data processing equipment 18.

FIG. 1 also shows a merchant computer 20 which is under the control and direction of a merchant. The merchant computer provides the information which the merchant wishes to present to the public over the internet. This typically includes general company information and products and services which the merchant offers to sell. The goods and services may be produced or rendered by the merchant, or they may be produced, rendered and/or distributed through other businesses with the merchant being just an order processor or one of several sources for the offered items.

Communications links between the customer computer 10, customer internet service provider 12, internet 15, merchant internet service provider 18 and merchant computer 20 may use a variety of data processing communications vehicles. Future advancements in communications vehicles allowing such data processing communications are expected to perform the same or similar functions, or enhanced functions which are not yet available.

FIG. 1 also shows a bank computer 30. Bank computer 30 stores or accesses customer account information relating to the bank's customers who have charge accounts, such as VISA™ and MASTERCARD™. The bank computer or computers 30 also perform certain analyses which are initiated by a merchant requesting authorization to charge a particular customer account.

FIG. 2 further illustrates steps performed in a typical prior art internet purchase transaction. The customer computer accesses the merchant computer in step 41 to obtain information relating to the customer's interest and planned placement of an order or orders.

Step 43 involves interaction between the customer computer and the merchant computer wherein the customer builds an order file. The order file includes the ordered items, the shipping or delivery address, the cost, and sensitive customer charge account information. As explained above the customer charge account information usually includes the account name, account number, card type, card expiration date and the amount to be charged the customer's account.

After the customer has provided such order file information, then the merchant checks the order file for completeness in step 45. In step 47 the purchaser submits the order file to the merchant. The merchant then performs initial processing in step 49. The merchant's initial processing may include one or more analyses which implement the merchant's policies concerning submission and processing of customer orders. For example, the merchant may perform an analysis to see if the item selected by the customer is available and the date of availability. This may be compared against management-determined ranges for acceptable delivery response.

The initial processing by the merchant computer also commonly involves payment analysis to determine whether the order has been placed using a payment method which is valid and authorizes payment. The payment analysis usually processes instructions from the customer computer to charge a bank card charge account, which can be either a credit or debit account associated with the customer. To properly process such a payment method, the merchant typically submits the requested transaction for approval or authorization by the bank card company or it's processing service, as illustrated in step 51 of FIG. 2. The payment analysis uses the customer charge account number, expiration date, cardholder's name, and the amount of the charges being submitted for approval.

Step 53 of FIG. 2 represents the bank's analysis of the authorization request. This bank card analysis uses the customer account number and internal information, such as the credit or account limit on a credit account or account balance on a debit account. The analysis determines whether the bank authorizes a charge to be made against the identified account. The bank then responds to the merchant in reaction to the charge authorization request in step 55.

The merchant then completes any additional order analysis or processing in step 57. Step 59 indicates communication of the initial order processing response from the merchant to the customer. This can be a confirmation of the order, refusal of the order, or query for additional information.

If the initial response includes acceptance of the order, then the merchant charges the customer charge account with the bank, as illustrated in step 61. The merchant's acceptance of the order leads to shipment of the order as directed by the customer when the order file was submitted in step 63.

This prior art practice includes transmitting sensitive account information between the customer computer 10 and the merchant computer 20. Such transmission is a security risk when transmitted over the internet. The basic internet structure is an open computer architecture which allows free access to everyone and involves repeated copying and re-transmission of data being communicated.

Security is also compromised when the merchant computer sends an authorization request to the bank computer 30. Again, this risk is increased if it occurs via the internet. Security may still again be compromised if account information is used in the bank card company's response to the charge authorization request.

Since this sensitive business information is communicated at least twice with any number of relaying intermediary data processors in between, there is significant opportunity for interception. This is particularly true when the customer account information is communicated over the internet to the merchant which in itself may involve numerous relays in transmission, all of which are openly available for others to access due to the open architecture of the internet.

The merchant's communications link with the bank computer may be either via the internet, or by dedicated secure communications vehicle, such as a dedicated telephone data transmission line or other suitable communications vehicles. Such "secure" transmissions may also involve numerous communications processors. These may or may not be susceptible to third party access for decoding and possible fraudulent use of the customer account information being communicated.

Another risk is associated with the employees of the merchant, bank, or other transmitters of account information. Even good organizations suffer incidents of embezzlement and absconding of information which can serve as the basis of fraud. Thus, it is inherent that current methods for handling charge card transactions are subject to fraud by manual and/or automated data interception.

The current methods for transacting purchases over the internet increase the risks of fraud because commonly transmitted charge account information used in each internet purchase is sufficiently complete to be used in the conduct of a fraudulent charge using another merchant who may be located anywhere in the world.

Preferred System Equipment Configuration for Invention

Figure 3:
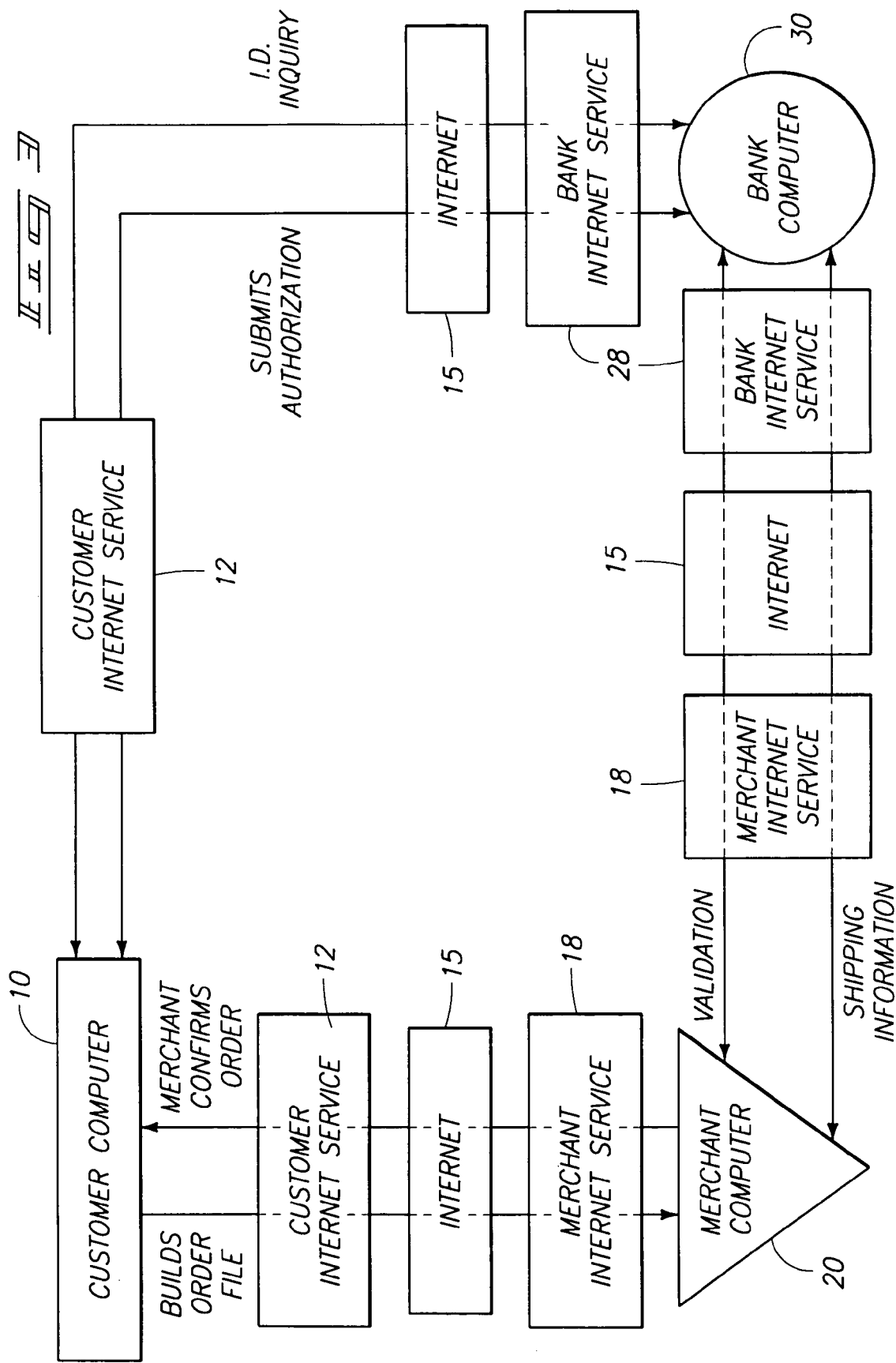
FIG. 3 is a block diagram indicating an equipment arrangement for conducting transactions over the internet according to this invention. The diagram also shows some of the principal actions indicated by arrows.

FIG. 3 shows a preferred equipment configuration and some aspects of preferred methods according to the current invention. Customer computer 10 is linked with the internet using the customer internet service provider computer 12. Data communications are conducted via the internet 15 between the internet service provider 12 and the merchant internet service provider computer 18. Merchant computer 20 is linked to the merchant internet service provider 18. All links use conventional data communications vehicles or suitable future technology communications vehicles.

FIG. 3 also shows merchant computer 20 communicating with bank computer 30. This can be a secure communications vehicle or via the internet as shown. The merchant internet service 18 connects through the internet 15 to bank internet service provider 28. Bank computer 30 is connected to the bank internet service provider 28. Bank computer 30 stores or otherwise controls access to customer account information and other bank information or third party information accessed by the bank computer.

FIG. 3 further illustrates customer computer 10 in communication with the bank computer 30 via the internet. Customer computer 10 is again connected by the customer internet service provider 12 to internet 15. Internet 15 is connected to bank internet service 28 and hence to bank computer 30.

Preferred Communications Linkages

The diagram shown in FIG. 3 illustrates a significant difference utilized in some of the preferred methods according to this invention. FIG. 3 indicates that the customer computer 10, merchant computer 20 and bank computer 30 can be in simultaneous or effectively simultaneous communication. Simultaneous or effectively simultaneous communication allows one party to communicate with another and immediately thereafter the same party can communicate to another party thus allowing a three party data flow on a real-time or nearly real-time basis.

Simultaneous communication does not necessarily imply that all three parties are engaged in a multi-party communications session where all or more than two parties are receiving the same data, voice, video or other communications mode provided by or to all other parties. Instead, it is preferred that the simultaneously or approximately simultaneous communication between these parties is established by discrete communications linkages. These discrete communication linkages are advantageously not in communication with other linkages except as controlled by the merchant, bank or customer computers acting as communications nodes in the purchase transaction communications tree.

As illustrated, FIG. 3 most clearly indicates three discrete communications linkages which define communications routes between the three key parties—the customer computer 10, the merchant computer 20 and the bank computer 30. This allows each of the three communicating pairs to communicate independently in a communications triad. In this communications triad each link communicates separately using different communications routes and/or vehicles. They can each also use different means for providing encoding, encryptions, data compression, or other data processing and communications techniques which make interception of meaningfully complete account information dramatically more difficult or effectively impossible.

These discrete communications linkages also enhance security for the processing of an internet purchase transaction without necessarily requiring use of encoding and encryption techniques because the linkages are independently created and would in general not share the same communications vehicles and relaying internet computers. Instead, for example, one linkage may be communicated by satellite through relaying computers between New York and Atlanta, whereas another linkage may be via optical fiber data communications land facilities between Miami and Atlanta. The third exemplary linkage may be by microwave transmission and land lines between Miami and New York.

The separation of certain data processing functions and key information to one of the three or more communications linkages in the purchasing transaction communications tree, thus provides increased security against surreptitious interception or collection of internet communicated files that have all the information needed to effectuate a purchase transaction according to prior art techniques, such as discussed above for charge card transactions.

The above configuration advantageously includes having the customer computer establish one data communications link, sometimes referred to herein as a first data processing linkage having an associated first communication route. This is most preferably via the internet as illustrated so that the customer can in a conventional manner initiate shopping over the internet. This customer-merchant communications linkage can function in many of the conventional ways now known or hereafter developed.

The second data communications linkage is established between the customer computer 10 and bank computer 30 using an associated second communications route. The third data communications linkage is established between the merchant computer 20 and the bank computer 30 using an associated third communications route.

The first, second and third communications linkages are preferably initiated or established in an independent manner through independent communications initiatives and communicating using different communications routes. They also are preferably configured such that each is using a distinct communications vehicle or vehicles so that the data involved with the some internet purchasing transaction does not get transmitted over the same communications vehicles in the same or a related transmission. This provides inherent added security for this internet purchasing transaction data communications equipment arrangement.

It should also be recognized that one or more of the communications linkages in the purchase transaction communications tree may alternatively be via a non-internet communications vehicle. For example, the customer-merchant communications vehicle is via the internet as illustrated. The second communications link between the customer computer 10 and bank computer 30 also is preferably via the internet for ease and economy. Alternatively, the customer may for specific reason have another linkage which is preferably a secure or dedicated communications link with the bank.

The third communications linkage is between the bank and merchant and is also preferably via the internet. It is alternatively possible that the third communications linkage may be via a non-internet communications vehicle, such as a dedicated data transmission line, direct modem connection, or otherwise as is now known or hereafter becomes available in the art.

Customer Account Setup with Bank

The novel methods according to this invention include creating a customer account with the bank having certain attributes and features as explained herein. The setup of the customer account can be accomplished in a number of different ways, but includes limited communication of certain types of information relevant to the conduct of internet purchase transactions in accordance with the invention.

In general, the creating of a customer account involves associating the bank's customer account information with a particular customer. The customer can be an individual, association, government, corporation or other entity which is interested in conducting a purchase transaction over the internet utilizing the methods of this invention. The exact manner of associating the customer with the account can vary dependent upon the bank and how it wishes to organize the customer accounts and associated data. In one example, the customer account may be associated with a customer by using a customer identification code. The customer identification code may be an account number, account name, account alpha-numeric identifier or other means for identifying the customer in the records of the bank.

Customer-Originated Account Information

The creating of a customer account involves communicating information from the customer to the bank for use in connection with the customer account. The customer account information includes customer-originated information which is communicated by the customer to the bank. Examples of customer-originated information would typically include the customer's name, home and/or business address, phone number, social security number, tax identification number and other information, such as discussed below.

Bank-Originated Account Information

The process of setting up the customer account may also include communicating customer account information from previous records of the bank. This may involve communication from one division of the bank to another division of the bank. Customer account information originating from the bank is herein termed bank-originated customer account information. The bank-originated customer account information may not need to be specially communicated and could be called upon by authorization of the customer or by policy of the bank.

Third-Party-Originated Account Information

Additionally, methods according to this invention may use customer account information provided by third parties. Exemplary third-party-originated information may include credit information from a credit reporting service or other business or credit reference. Another form of third-party-originated information may be various types of information from a government entity, public records or other publically available information.

Communicating Customer Account Information

Preferred methods according to the invention include communicating some of the customer account information to the bank, preferably with at least some of the information being communicated via one or more communications vehicles which are not over the internet. This allows the customer account information to include information which comes via another mode, source or vehicle. This helps to provide additional security so that fraud cannot easily be practiced. Fraud may otherwise be possible merely by intercepting communications made via the internet, using publicly accessible files. The accessible files are then used for fraudulent schemes and can be easily perpetrated against prior technology.

Methods for communicating some of the customer account information may also include communicating via the internet for a portion of the customer account information. This allows simplicity in some aspects for setting up portions of the account or for providing additional information desired after the account has been set up or partially set up. Such internet communicated account information may come from any suitable source. For example, the customer may provide it's name along with a request to setup an account via the internet. Other customer account data fields may be completed via telephone using customer-originated information, which may be combined with bank-originated information and third-party-originated information, both or only one of which may be provided via the internet or using non-internet communications.

Customer Account Information Control & Maintenance

The customer account information maintained by the bank, or by a service or equipment vendor maintained for the bank's use, is advantageously stored in the form of a data processing accessible database or the equivalent. The database can be maintained on a bank computer or computers, or at computers or other database storage and data processing equipment maintained for the bank and which is accessible thereto. The bank's access to the customer account database is preferably via a dedicated or secure communications conduit, such as within the bank's data processing equipment or between the bank's data processing equipment and a service vendor which utilizes a secure, dedicated, encrypted and/or encoded communications link with the bank.

Customer Account Information Field for Computer Identification

The customer account information with the bank, or maintained for the bank, also preferably includes a number of customer account information fields. One customer account information field preferably includes customer computer information. The customer computer information includes at least one customer computer identification code or other computer identification information which is used to associate the customer account with at least one authorized customer computer. The customer computer identification information kept by the bank is used to identify when a computer is an authorized customer computer which is set up and authorized to conduct transactions for the customer. The bank's customer computer identification information may include information for one customer computer, or a plurality of customer computers.

The bank's customer computer identification information may be used in connection with one authorized customer computer, or by more than one authorized customer computer. In one form of the invention a single authorized customer computer identification may be used on multiple computers; such as home, office, laptop, etc. for a single user. In another form of the invention the bank customer computer identification information may be uniquely associated with a single, particular customer computer in such a way that no other customer computer is associated with such information. This can be done by utilizing unique information which can be stored on the customer computer and is not capable of being reproduced onto another computer.

The associated bank data field used to specifically or uniquely identify an authorized customer computer may take various forms now known or hereafter developed. One example would be information kept by or for the bank which indicates what a file stored on the customer computer will contain when read or interrogated by the bank computer using a code key, or other decoding or deciphering means now known or hereafter developed.

The contents of a customer computer identification file or files may remain fixed over time. Alternatively, the computer identification information may vary with time, so as to be unique at any particular point in time. Still further, such information may change or be changeable each time or at a certain frequency or variable frequency or variable frequency when read by the bank. Such information may also, as a matter of programming, change over time either by data processing which occurs on the customer computer or as a result of a process performed by the bank computer during reading or interrogation.

In other forms of the invention the file or files on the customer computer identification information may change as a result of some additional variable or parameter other than time. Exemplary alternatives may include parameters such as bank or customer transaction numbers, control numbers or other variables. In some forms of the invention the bank changes the customer computer identification information as each customer purchase transaction is processed or at each instance of communication between the customer and bank. The associated change in the authorized customer computer identification may not involve time as a factor but may merely depend on the number of bank-customer communications interactions.

The customer computer identification information is used on or with the customer computer in such a way as to provide a secure, specific, and preferably unique, identifier which can be read or otherwise identified by the bank when in communication with the customer computer. Such communication between the customer computer and the bank can be effected in a variety of suitable ways, but typically and preferably will be communication over the internet in the course of conducting a purchase or similar transaction. Alternatively, it may be more advantageous for some or all of the computer identification information to be communicated between the authorized customer computer and the bank computer via direct telephone modem or other communication methodology when setting up or creating the customer account. The communications alternatives will in some forms of the invention have at least one non-internet communications vehicles.

Customer Account Information Field for Delivery Address

The process of setting up or creating the customer account with the bank also preferably involves providing the customer account with customer delivery address information associating said customer account with at least one authorized customer delivery address.

Customer delivery address information kept by the bank computer 30 can be inclusive of a single home or business delivery address. This provides a more secure purchasing transaction because methods according to this invention include verification of the shipping or delivery address directions given to the merchant so that shipments are directed to a street address or other address which is tied to the customer. The delivery or shipping address setup information is preferably information which can be authenticated. The setup authentication preferably uses third party authentication or bank-originated information which is useful for authenticating, and further preferably uses means other than internet communicated information ostensibly from the customer computer.

Authentication of the shipping or delivery address can in one form be provided by having the delivery address supplied for set up in the bank customer account records using a non-internet mode of communication, such as personal communication. For example, a person could appear in person at the bank and provide personal identification for setting up a portion or all of the customer account verification information. Another possibility is for the customer to provide authorized delivery addresses and other customer account information to the bank via voice phone line. Other communications vehicles for supplying setup information may alternatively be used, such as direct modem communications between the customer and bank.

The shipping or delivery address is a key piece of order information because without such information the internet merchant cannot provide the goods or services requested. The shipping or delivery address also may serve as customer verification and authentication information according to some of the preferred methods according to this invention. The delivery address can be used as order verification information by having the customer include the desired delivery address as part of the order file and the merchant can submit the requested delivery address to the bank for verification and confirmation during the bank's analysis determining validation of the order.

During the course of a purchase transaction, the delivery address can alternatively be supplied by the bank to the merchant. This may be done after the customer has selected during communication with the bank, the desired authorized delivery address from a group of one or more previously set up authorized customer delivery addresses contained in the customer account records held by or for the bank.

To enhance security, the customer may during communication with the bank indicate the desired authorized delivery address from a set of available options and/or in a shorthand manner. For example, the customer goes through a delivery address selection process which allows the customer to only select one of the authorized customer delivery addresses set up in the bank's customer account information.

To further illustrate the shorthand presentation of authorized delivery addresses, the customer is placed in communication with the bank, such as diagramed in FIG. 3. The customer is then prompted to select from his or her "home address" or "office address" as queried by the bank in an on-line communications sequence. The full home or office addresses need not be communicated between the bank and customer using the internet. The customer may click upon one of the addresses indicated in shorthand. This is done as part of requesting the bank to validate and authorize the transaction. The bank is also requested to assure the merchant of payment and/or provide payment to the merchant. The bank, after successfully completing its validation analysis of the purchase transaction, sends assurance of payment to the merchant and directs that shipment must be to an authorized delivery address specified by the bank to the merchant. Alternately, the delivery address may be confirmed by the bank as supplied by the customer to the merchant.

The customer authorized delivery address information is preferably provided to the bank for account setup using a non-internet information source or communications vehicle, such as a voice telephone line. More preferably, the authorized customer delivery address information is provided to the bank by the customer using a caller identification telephone line which can be linked with the customer and/or authenticated as explained further below.

The customer may have routine address options such as home or office address. The customer may also have secondary or incidental delivery addresses to which purchased goods may be directed. For example, secondary address may be setup regularly for close family members upon request from the customer in a request which can be authenticated to the true customer.

Incidental addresses used by the customer, such as for gifts to friends or other people, can be handled similarly. The customer calls and submits the additional authorized delivery address using a caller identification telephone line authenticated to the customer and/or user. The bank then edits the customer record to add the additional authorized addresses. These too can be presented in shorthand during purchasing transactions using a variety of different shorthand terms picked by the user.

Customer Account Field for Telephone Caller Identification

The customer account with the bank may also include authorized telephone caller identification information which is associated with the customer. The telephone caller identification line information can be used to provide immediate authentication evidence if it matches with other customer account information. This may be supplemented using additional telephone company or other third party information which provides supporting authentication that the telephone line being used is associated with the customer for which the bank has an associated customer account.

The telephone caller identification information is preferably authenticated in some forms of the invention. The telephone caller identification information may be authenticated by third party authentication using the phone company or other third party.

Alternatively and more simply, the telephone caller identification information can be used directly as a verification parameter because the customer used the same telephone line when setting up the customer account with the bank. Thus the bank verifies that each purchase transaction communication between the customer and bank is via the same telephone line or one of several authorized telephone lines.

It is also possible to use one or more of the above verification techniques in combination with an additional third party authentication process. This is preferably performed such as by comparison to a credit report which includes the customer's address information and telephone number. With these pieces of information, the customer telephone caller identification may match either or both the telephone line used during the customer account setup, and/or by comparison of the telephone caller identification information with third party information to perform an authentication process.

User Identification Codes

Customer account set up at the bank further preferably includes another field or fields of information to define authorized users for the customer account. This is done by setting up a user personal identification number or other user identification information and coding. The user identification code may be selected by the bank, or the code may reflect the user's choice. A particular requested personal identification number or (ode can be numeric, alpha-numeric, alphabetical or some other code configuration.

The user identification (ode is set up, and is provided in the customer account records at the bank for the authorized user or users and the associated customer account. This personal identification information is preferably communicated using a non-internet means of communication. This is advantageously done using a secure non-internet means of communication. One suitable form of communication is via voice telephone line. Alternatively, an email communication to the user of the user's personal identification (ode may be employed. Email communicated over the internet may be acceptable depending upon the policies and levels of security determined by the bank and customer. Other modes of communication such as telephone caller identified voice discussion, written notification, or personal communication may also be suitable in some of the methods according to this invention.

Customer Account Verification Information

The customer account information kept by or for the bank includes customer account verification information. The customer account verification information may include one or more, or various selected combinations of the following types of information.

One verification parameter is the shipping or delivery address or addresses as discussed above. By performing a verification process using delivery address of a purchase transaction order, the bank can help assure that the purchase transaction includes goods or services which are being provided to an actual customer at it's authorized address.

Another verification parameter is customer computer identification information as discussed above. By performing a verification process using customer computer identification information at the bank and customer computer, the bank can help assure that the purchase transaction is being made from a computer authorized by the customer as a source for authorized purchase transactions.

A further verification parameter is telephone caller identification information provided on the telephone line used by the customer to communicate with the merchant, the bank, or both. By performing a telephone caller identification analysis, the bank can help assure that the purchase transaction is being placed using an authorized customer telephone line having line or caller identification.

An additional or alternative verification parameter is user personal identification information as discussed above. By performing a user personal identification verification analysis, the bank can help assure that the purchase transaction is being placed by an authorized user for the particular customer account being used.

Other types or forms of customer account information can also be used as verification information used by the bank in making one or more verification analyses as part of the bank's process in considering and determining whether a purchase transaction is properly validated or invalidated.

The one or more verification analyses performed by the bank in processing a purchase transaction validation request preferably employ information which is obtained from the customer computer. This is advantageously done by placing the bank computer 30 and customer computer 10 into active communication with one another. This can be most easily done using the internet as illustrated in FIG. 3. It can also be done using other alternative communications vehicles.

FIG. 3 shows customer computer 10 submitting a purchase transaction authorization request to the bank computer. This is preferably done directly with the bank. Alternatively, it can be done via relay by the merchant computer.

In the preferred versions of the invention, the bank computer 30 responds or precedes the customer authorization request with an identification inquiry. This can use one or more of the verification or authentication parameters or other identification means. In general, the larger the number of verification or authentication parameters considered by the bank in the identification inquiry, then the reliability of the inquiry tends to improve. Typically, the identification inquiry will use verification of customer account verification information. For example, the user personal identification and customer computer identification information associated with the customer account would be verified. Also, the telephone line caller identification may be used to verify the caller identification relative to caller identification information kept re the associated customer account. This can be to verify to customer account information, or additionally or alternatively in an authentication mode. Other verification parameters may also be used.

The bank verification analysis or analyses can be the determinative factors in leading to a bank decision whether to validate the purchase transaction. It is also possible to combine one or more verification analyses with one or more authentication analyses as indicated in this document.

In performing validation analyses, the bank can also employ verification or authentication of one or more verification or authentication parameters used in connection with a merchant account set up with the bank. The same or different verification or authentication parameters may be used with the merchant as are described with respect to verification and authentication of the customer and user as described herein.

Customer Account Authentication Information

The customer account information kept by or for the bank preferably includes customer account authentication information. The customer account authentication information can include one or more or various selected combinations of the following types of information or their equivalents.

One authentication parameter is the shipping or delivery address as discussed above. By performing an authentication process determining the authenticity of one or more of the customer authorized delivery addresses, and then verifying a delivery address of a purchase order, the bank can help assure that the purchase transaction includes goods or services which are being provided to a customer at it's authorized and authenticated address.

Another authentication parameter is customer computer identification information as discussed above. By performing an authentication process using customer computer identification information at the bank and customer computer, the bank can help assure that the purchase transaction is being made from a computer authorized by the customer as a source for authorized purchase transactions and authenticated by the bank after setup.

A further authentication parameter is telephone caller identification information provided on the telephone line used by the customer to communicate with the merchant, the bank, or both. By performing a telephone caller identification analysis, the bank can help assure that the purchase transaction is being placed using an authorized customer telephone caller identification telephone line by a customer authenticated to the specific telephone line by comparison with corresponding authentication information, such as from one or more third parties.

An additional or alternative authentication parameter is user personal identification information as discussed above. By performing a user personal identification authentication analysis, the bank can help assure that the purchase transaction is being placed by an authorized user for the customer account being used.

Other types or forms of customer account information can also be used as authentication information used by the bank in making one or more authentication analyses as part of the bank's process in considering and determining whether a customer account should be set up or a purchase transaction should be validated or invalidated. Authentication processes used during setup are termed setup authentication, and authentication processes used during transaction validation are termed transaction authentication.

The one or more authentication analyses performed by the bank in processing a purchase transaction validation request preferably employ information which is obtained from the customer computer. This is advantageously done by placing the bank computer 30 and customer computer 10 into active communication with one another. This can be most easily done using the internet as illustrated in FIG. 3. It can also be done using other alternative communications vehicles.

FIG. 3 shows the customer computer 10 submitting an authorization request to the bank computer. This is preferably done in a linear communications relationship connecting the customer with the bank without involvement of the merchant. Alternatively, it can be done via a relay communications relationship through the merchant computer.

In the most preferred versions of the invention, the bank computer 30 responds to the customer validation and authorization request with an identification inquiry. This can use one or more of the validation and/or authentication parameters. The larger the number of parameters considered by the bank in the identification inquiry, then the reliability of the inquiry tends to improve.

The bank validation analysis or analyses can be the determinative factor or factors in leading to a bank decision whether to validate the purchase transaction. It is also possible to combine one or more validation and/or authentication analyses with one or more other verification analyses as indicated elsewhere in this document.

In performing validation analyses, the bank can also employ verification and/or authentication of one or more parameters associated with the involved merchant. Such merchant account parameters are used in connection with a merchant account which is also set up with the bank. The same or different authentication or verification parameters may be used with the merchant as are described with respect to verification and/or authentication of the customer and user as described herein.

Customer Account Setup at Customer Location

In addition to the customer account setup at the bank, there is also preferably setup at the customer location. The customer computer may be provided with programming that allows the bank to access the bank-encoded or otherwise provided customer computer identification code. A variety of known identification methods are possible. One suitable form of identification is sometimes referred to as a "cookie". The preferred cookies for the invention are selectively allowed by the customer computer to be written to the customer computer in a form which allows the bank to positively identify the customer computer. A variety of formats may be used to produce and render secure the cookie or cookies sent to the customer's computer by the bank.

The cookie is preferably written or encoded onto the customer computer one or more times in a communication or series of communications between the bank computer 30 and the customer computer 10. This can be accomplished by direct modem interaction over a regular telephone line or using other communications vehicles. Alternatively, the communications between the customer computer 10 and the bank computer 30 can be via the internet as illustrated in FIG. 3. The communication or communications sending the cookie, cookies or other computer identification coding is preferably encrypted to improve security, particularly with regard to setup of the customer computer for bank identification inquiries.

The cookie or other customer computer identification can be a single sequence or code written a single time. Alternatively, it can be a code or series of codes which are written at different times. A further alternative is that the code placed on the customer computer for identification by the bank can be written in plural sessions and/or repeatedly. A further alternative is to rewrite the computer identification in part or in whole during each transaction.

A still further alterative is to write identification coding each time the customer computer is used with the bank to provide a historical series that cannot be reproduced by interception of any one communication. The computer identification may be subject to processing by specific use programming written onto the user's computer, such as by the bank during setup. The programming may include a code key which is static or variable, such as variable with time or with customer, bank or other transaction history.

The customer computer identification may also be subject to processing by the bank computer, and such may include a code key which is static or variable, such as variable with time or with customer, bank or other transaction history. Still further, the customer computer identification may be subject to combined processing by both the customer computer programming and the bank computer programming, and such may include a code key which is static or variable, such as variable with time or with customer, bank or other transaction history. A variety of customer computer identification techniques can be used as may now be known or using new technology hereafter developed.

It is also contemplated that the customer computer 10 will be provided with software which facilitates or is required to allow communication between the customer computer 10 and the bank computer 30 to selectively allow the customer computer identification processing steps to be performed in setting up the customer computer. Such software may also be used in conducting purchasing transactions involving the bank and customer.

Another feature which may be allowed is the ability for a customer to transfer cookies or other customer computer identification tools between one customer computer and another customer computer. This would only be permitted if the bank and customer programming so provides. If such is allowed, then the customer computer identification tools may be communicated between the two customer computers in several different ways; such as by direct wiring, or by email from the first to the second authorized customer computer.

The customer computer software may also provide the customer and associated users with various account management and utility features. Account management features may include allowing the customer to perform functions such as monitoring the purchase transactions made to the customer's account and monitoring payments made by the customer to pay the bank for customer charge transactions made. The utility features may also act as the means for allowing or controlling transmission of customer computer identification information between first and second customer computers.

Such programming may also advantageously have other capabilities and features which allow the customer and authorized users of the customer to use the account. Although such customer computer interface software may allow some modifications and information gathering, the preferred processes according to the invention may require in some implementations that setting up or changing of key or all customer account information fields occur using specific communications vehicles or modes. For example, changing (editing, adding or deleting) of customer account information fields may only be allowed by direct, non-internet communication. Further, account information such as authorized delivery addresses, changes to personal identification codes, changing telephone caller identification information kept by the bank, user personal identification or other account information may be modified only by non-internet communication. These setup or account information modification processes are preferably done using a non-internet vehicle of communications which can preferably be authenticated by the bank prior to implementing the requested information. For example, by telephone communication over a telephone line having telephone caller identification which matches and is an authorized customer phone line. Such fields may also require voice communication between authorized representatives of the customer and the bank.

Exemplary Setting Up of Customer Account

In one form of the invention a customer may initiate setup of a customer account with the bank. This can be done in various ways. For example, a customer may telephone the bank and request that the bank set up an account according to this invention. The customer could provide some or all of the customer-originated information indicated in the description given in this document. For example, name of customer, customer billing address, customer phone number, customer social security number, customer tax identification information, customer driver's license number, customer email address, customer authorized user identification codes, and other pertinent forms and fields of customer account information may be singularly or in combination provided in one or more modes or vehicles of communication and in one or more sessions.

The preferred methods for setting up the customer also preferably include authenticating one or more of the fields of customer account information by an independent authentication procedure or procedures. For example, one authenticating process would be for the bank to require that the customer provide some or all fields of the customer account information via a telephone line having telephone caller identification information available that matches the customer setting up the account. This matching for authentication may require that the named telephone owner as indicated by telephone company caller identification information be the same as the information supplied by the customer.

Another example of independent authentication information may include alternative or additional third party information made available by credit services or other companies having credit information or serving as credit references. Examples of such authenticating analysis would be to verify that one or more of the customer-supplied data fields match independent authentication information. Information such as customer name, account billing address, home address, home telephone number, social security number and other information given by the customer in setting up the account would be compared to the authentication information. Matched information of this type which corresponds with comparable customer information provided by the credit reporting agency or other third-party source of authentication information will provide an indication of authenticity during the customer account setup procedure.

Some preferred setup methods according to the invention also include plural authenticating procedures. In some forms of the invention, the new customer account is further subjected to secondary authentication procedures after the bank has performed at least one initial authentication test which confirms the authenticity of the new customer account and demonstrates reliability of at least one field of customer account information which is a verification parameter. Then the bank may instruct the customer to establish a data communications linkage with the bank to allow the bank to provide computer identification information to the customer computer. Such communications sessions can also be used to load customer and user interface software which facilitates the use of the customer account by authorized users of the customer. Such interface software may also play a role in facilitating the bank's computer identification inquiry and provide on-line verification or authentication of the customer computer and authorized user during purchase transactions.

The setting up of the customer computer and user, and the setting up of the customer account information held by the bank may include establishing data communications between the customer and bank using at least one session where a non-internet data communications vehicle is employed. For example, the bank may during the setup process instruct the customer to establish direct modem communications with the bank to download the interface software and provide the customer computer with a bank identifiable authentication code or codes and any encryption software. The processes may require a single non-internet communications session or plural sessions whereby the computer identification information provided to the customer computer may be expanded, replicated, rendered more encoded, or encrypted using a single or plural encryption techniques.

Customer Account Activation

Preferred methods according to this invention further include activating a customer account. The customer account is most preferably activated after the bank has received some or all of the customer account information. It is also advantageous that the customer account be activated after the bank has performed at least one setup authentication process deemed appropriate by the bank according to the banks security policies. For example, receiving setup information from a new customer using a caller identification telephone line that indicates the customer is authentic may by bank policy be sufficient authentication for activation of the account. Alternatively, more fields or other fields can be used in a setup authentication analysis.

It is also possible that the setup authentication may proceed in a progressive manner. After an initial contact and at least one setup authentication analysis, the bank may provide limited utilization, such as a small credit limit. The credit limit may be increased after additional authentication procedures have been performed successfully. The credit limit may also be increased after additional customer utilization establishes that the account is performing validly. Such progressive authentication will allow greater reliability as the customer history progresses in time or transaction number.

Activation may also advantageously include writing to the customer computer. The writing to the customer computer may include interface programming as discussed herein. It also typically will include writing, encoding or otherwise providing the customer computer with customer computer identification coding and programming needed.

In some of the preferred methods according to this invention, the activation of the customer account may also be made contingent upon successful testing. Test communications can be conducted between the customer and bank. This can be in the nature of a test communication whereby the customer goes to a special web site operated by the bank and then proceeds to conduct a test internet purchase transaction. In such test transaction the user will be prompted for entry of the user's personal identification code. The user's actual name may be supplied as added verification but is not believed necessary since the customer's computer has been provided with bank accessible customer computer identification information. This can be assessed either before or after the user is prompted for the user's personal identification code.

In one optional form of the invention, the customer account setup and activation is abbreviated to facilitate immediate limited use of the account and this is further detailed hereinbelow in a separate section of this document.

Merchant Account With Bank

Methods according to preferred forms of the invention may also include setting up a merchant account with the bank. This is advantageous to further reduce the risk of fraud and to facilitate and speed payment to the merchant. It is also desirable in establishing a legal foundation between the bank and merchant whereby the merchant is prepared and willing to accept assurance of payment from the bank as contrasted with actual payment or funds transfer. The processing of internet purchase transactions will be facilitated by prior setup of the merchant with the bank.

The process of setting up the merchant with the bank can vary significantly depending on policies of the bank and can vary with time to improve or modify processing and transaction of the internet purchases. The merchant can be set up using some or all of the same procedures described above in connection with preferred processes for setting up customers. Some modifications, additions and/or abbreviations may be in order depending upon the policies of the bank and the desired level of security relative to convenience.

One possible abbreviation which may be as acceptable is to not employ third-party transaction authentication of the merchant computer for reasons of processing speed or economy. If the bank has a merchant account set up with various fields of data and since the merchant is primarily looking to get paid, then it may be sufficient that the merchant receives assurance of payment and/or payment without the bank performing authentication of the merchant computer involved in the purchase transaction.

Authenticating and/or verifying the identification of the merchant computer is preferred in other implementations of the invention. For example, in some of the preferred methods the customer establishes communications with the merchant and then indicates to the merchant that payment will be assured and/or made by the bank. Since the merchant is looking for payment assurance, it may be to the increased satisfaction of the merchant for the merchant to establish the third communications link directly with the bank. This approach may improve the confidence that the party contacted by the merchant in seeking transaction authorization is in fact the bank. The bank then may perform an authentication process similar, the same, or employing one or more of the processes, aspects and features described hereinabove in connection with the bank identifying, verifying or authenticating the customer. Accordingly, any, all or various combinations of authentication procedures and features may be used by the bank, including those used to authenticate the merchant's computer.

Alternatively, the bank may choose to more simply verify the merchant computer identification with merchant account verification information kept by the bank. This can be done without performing additional authentication analysis, or authentication analyses which utilizes third party information or other independent authenticating information.

The description given hereinabove concerning the bank and customer relationship thus is applied by reference to describe the possible use of some or all of the authentication procedures and/or various verification procedures described in connection with the customer account for use in considering the setup of the merchant and whether a transaction being analyzed by the bank should be validated and payment assured to the merchant.

It should also be understood that some forms of this invention may include internet purchase transactions where the merchant has not been previously set up with a merchant account with the bank. In such situations it may be desirable to set up the merchant during the course of the purchase transaction. This setup option during the course of the transaction may be either a partial setup or a complete setup depending upon the bank's policies and desire for security in validating and paying for internet purchases.

In other forms of the invention the merchant may not in a practical manner be set up at all since the procedures may simply involve transfer or delivery of funds automatically after or at the time the transaction is validated and authorized by the bank. For example, the bank and merchant may be in communication and the merchant instructs payment to be sent by check to a stipulated address at which the merchant receives payments. Electronic transfer of funds may similarly be directed as the merchant and bank find acceptable. Other payment options are also potentially acceptable.

Merchant Account Setup at Merchant Location

Depending on the degree of security desired, the setting up of the merchant account at the merchant computer may employ actions by the merchant and/or bank similar to those described hereinabove with regard to setup of the customer account upon the customer's computer. Analogous or the same procedures may be used at or upon the merchant computer 20. Such description shall be applied by reference without being reiterated at this point in this document.

In some respects the setting up of the merchant computer may be tailored more specifically to the needs of the bank and merchant. For example, the merchant may be provided with merchant computer identification or not. This in turn may allow simplified software to be used on the merchant computer to speed order processing or provide other enhanced abilities or features. One or more of the above-explained customer setup techniques may be applied alone or in combinations for the setup of a merchant.

Merchant Account Activation

The explanations provided above with regard to setting up and activating a customer account may also be employed in part or in whole with regard to activation of a merchant account. The description given herein is applied by reference to merchant account activation as described above to provide preferred forms of the invention.

The merchant account setup process and activation process may also be abbreviated or eliminated. For example, the merchant could be informed that it is not yet fully set up, but that a one-time transaction account is being established in the merchant's name at the bank. The merchant can obtain payment as the merchant subsequently instructs the bank.

Alternatively, the bank could assure payment and communicate that payment in a desired form is being made to the merchant, for example, the assurance of payment may be communicated by the bank to the merchant along with an indication that the bank is sending payment. Such payment can be by check, electronic funds transfer or other suitable means. Payment effected by bank check payable to the order of the merchant illustrates that merchant account setup would not be an absolute requirement, although such is preferred under this invention.

In the most preferred forms of this invention the merchant would preferably be paid after the bank performs at least a minimal amount of merchant account setup and either or both verification and/or authentication of the merchant during both setup and in processing purchase transactions. This can be done analogous to the discussion given herein with regard to initial use by a new customer.

Order File Creation

Preferred methods according to this invention include order file creation. The customer is principally involved in creating the order file. Key or principal aspects of the order file include: a) specifying the goods or services, or both, which the customer seeks to obtain using the merchant; and, b) specifying the delivery or shipping address to which the goods are to be shipped or delivered, or at which the requested services are to be performed.

The order file will typically be assembled using ordering software which the merchant provides or makes available at the merchant's web site. Since conventional merchant order taking software requires a preliminary assessment of means for payment, this indicates the appropriateness of implementing modified order software when orders are to be paid using the bank and methods according to this invention. Preferably the modifications direct the order taking software into ancillary programming which is associated with the assurance of payment and payment processes described herein according to this invention.

Under some of the methods according to this invention, the customer accesses the merchant web site and then builds the order file by specifying the goods and services. The order file may also include the customer's name, although such is not strictly necessary. The essential fields in the order file are the goods and/or services and delivery address information. The merchant may elect to require more information, and typically the customer name or some other customer identifier will be used to increase reliability of the ordering process. Also desirable is telephone or email contact information for the customer and user representing the customer.

It is also typically desirable for the order file to define the costs associated with the order. This is provided so that the customer may consent to the amount of charges being incurred by the customer, and the amount to be assured and paid by the bank.

Many additional fields of information may be included in the order file as desired by the merchant or bank, and in compliance with any agreement entered into between the merchant and bank.

In preferred methods according to this invention, the order file used in placement of the customer order with the merchant does not include a customer account number, numbers or codes which is or are separately useful to apply charges to the account. This is eliminated to reduce the risk of internet fraud or other misuse of the customer account with the bank. Instead, the customer builds the order file in part or in total and specifies that payment will be assured and made by the bank. This is preferably implemented using a displayed icon on the merchant's web site which allows the customer to at some point in the process of building the order file, or after it is complete, to indicate the use of the bank as the means for payment.

Where a merchant is previously set up with the bank, then the election by the customer to use the bank for payment may advantageously cause the merchant's order file building program to enter into a programming routine or sub-routine that does not require an account number to be communicated. Other information may also be omitted to minimize the risk of interception and/or fraud.

In some forms of the invention, the order may be assembled by a customer with merely the ordered items specified, the identity of the merchant, and a transaction identification or control number. Alternatively, merely with the ordered items and customer's name or other customer identification. The customer may either provide a delivery address in the order file, or this information can be omitted from the customer's order file and supplied solely by the bank. Alternatively, the order file can include a customer's specification of the delivery address and this information can be relayed by the merchant to the bank for verification. The bank can then verify that the delivery address is an authorized delivery address for the customer involved prior to validating the order.

In another form of the invention, the customer builds the order file with the delivery address being provided to the merchant. The customer establishes independent communication with the bank seeking authorization of the purchase transaction. Then the customer is required to specify the desired delivery address to the bank. This can be done in response to an inquiry by the bank computer. It can also be done using a shorthand listing of authorized delivery addresses so that the customer and bank do not therebetween communicate the delivery address in sufficiently complete form to allow interception.

The order file may alternatively be built in one or more order file building sessions involving one or more communications linkages via the internet between the customer and merchant. The order file may be saved and then retrieved for later editing and placement of the order.

Communicating Between the Customer and Merchant

In methods according to the invention the customer establishes communication via the internet with the merchant. The mode of communication via the internet may use any acceptable protocol or security precautions now known or hereafter developed. The mode of communication can be encrypted or use other secure network procedures. A variety of communications options arise and are possible because the customer is advantageously not transmitting sensitive information, such as the account number and expiration date coupled with account name.

In alternative forms of the invention, the customer may initiate the purchase transaction by contacting the bank and providing an indication that an order is planned. Thereafter, the merchant may be contacted. This can occur directly between the customer and merchant, or using the bank as an intermediary.

Order Placement

Methods according to this invention also include placement of the customer's order with the merchant. This is most frequently done by communications linkage between the customer and merchant computers, such as illustrated in FIG. 3. The placing of the order will typically occur shortly after the customer has assembled the requisite information in the order file as required by the merchant. This may be modified for orders being paid by the bank in accordance with this invention.

Placement of the order will preferably entail specification by the customer that the means of payment is via the bank. The merchant therefore looks to the bank for assurance of payment and/or payment.

In alternative forms of the invention, the customer may contact the bank and build the order file and/or place the order via the bank's computer. The bank can then assure payment to the merchant in the same or a separate communication from the communication including placing or confirming the customer order.

In either of the above alternatives, the customer account number is not communicated to the merchant. Also in such alternatives, the customer's communication with the bank does not require providing information which is sufficient to allow an intercepting party to place orders which charge against the customer's account. This should be contrasted to the current practices explained above which provide such information and require it to be relayed, usually multiple times.

Communicating Between Customer and Bank

Preferred methods according to the invention also include communicating between the customer and bank whereby the customer submits a request for bank authorization, and for the bank to assure payment and/or make payment to the merchant. FIG. 3 illustrates an internet communications linkage between the customer computer 10 and the bank computer 30. This is done via customer internet service 12, internet 15 and the bank internet service 28.

In alternative systems and methods the customer computer 10 may be directly connected via modem (not illustrated) to the bank computer 30. Other communications vehicles and various communications routes can be employed to provide data communications between the customer and bank.

In some of the methods according to this invention the customer communicates with the bank in non-internet forms of communication. This includes the direct modem connection explained above. It is also possible to employ direct, in person communications between a customer and a representative of the bank. Further it is possible to use telephone voice lines, fax communication or other non-internet communications vehicles. This is particularly advantageous in the setup phase, but also can apply to editing or other changes to the setup information.

It may also be desirable to use non-internet forms of communication between the customer and bank in the course of a purchase transaction. The customer or bank can initiate the communication, which is preferably a data processing communications vehicle. Data concerning the proposed order and other data passed between the customer and bank are communicated to perform the methods according to this invention.

Initiation

The communications linkage between the customer and bank computers can result from customer initiation or bank initiation. This can be done either before or after the order file is created and/or placed. In one preferred version of the invention, the user representing a customer first builds an order file at the merchant's web site. Then the customer indicates while in communication with the merchant via the internet, that the customer wishes to pay using the bank. This is easily provided by having an internet link between the merchant's web site and the bank computer 30. This can be part of the merchant setup with the bank.

The selection of the bank using the merchant web site link or other suitable means initiates a data communications linkage between the customer and bank. This is preferably a direct connection between the customer and bank.

In alternative methods according to the invention, the customer may indicate while at the merchant web site that the customer wants to pay using the bank. Instead of the customer initiating the communications linkage with the bank, the customer's placement of the order with the merchant can result in a communication between the merchant and bank. The merchant communicates with the bank and indicates that the customer has placed an order that includes a request that the bank is to be used to assure payment and/or make payment for the customer order. The merchant can communicate relevant information to the bank indicating the transaction control number, customer identification, and amount of charges associated with the order.

In response to the merchant's communication with the bank, the bank initiates a communications linkage with the customer. The customer computer 10 can be contacted via the internet or by other data processing communications vehicles.

The merchant information supplied to the bank concerning the customer order includes transaction identification which is also provided to the customer computer. When the bank computer establishes communication with the customer computer, then the bank goes through an identification inquiry and verification and/or authentication processes to determine that the bank has contacted the proper customer user and proper customer computer which is authorized to be involved in the identified transaction with the merchant.

Bank Identification Inquiry

After communication has been established between the bank and customer, the bank performs a bank identification inquiry. The inquiring action may involve a number of different identification procedures. These identification procedures may be the same as described above using verification of customer account information and/or authentication of the customer computer and user using one or more of the indicated analyses.

A preferred identification inquiry performed by the bank relative to the customer utilizes the customer computer identification setup on the customer computer. The bank computer performs an identification inquiry which is preferably in an encoded form. The customer computer must provide a satisfactory response identifying the customer computer to the bank computer. If proper identification is not achieved then the communications session is terminated.

If proper identification of the customer computer is achieved, then the bank further analyzes to determine whether the personal identification information given by the customer computer user is an authorized user. This is done by verifying that the personal identification code given by the user is an authorized user personal identification code. It can alternatively or additionally employ other inquiries using other fields of customer and user information for verification or authentication.

The above identification analyses are used to properly associate in the banks records, the customer account and user for further processing of the communication and associated payment authorization request. The above-described identification procedures may also act as a portion of the verification analyses used in performing validity analyses, or as part of one or more authentication analyses, which may include just these considerations or may be combined with additional analyses to provide additional reliability for the authentication analysis and validation decision. The additional parameters may be any of those described elsewhere herein in connection with verification or authentication of the setup of the customer account and processing of the purchase authorization request, or other similar parameters.

Bank Authentication Inquiry

The communications between the customer and bank may also advantageously include an authentication inquiry by the bank to reliably determine whether the customer computer 10 is an authorized customer computer and that the user is an authorized user for such customer account. The authentication procedures explained above can also be applied during setup or a purchasing transaction validation analysis according to the invention.

The authentication procedures seek to determine that the customer computer and user are an authorized customer computer and an authorized user for the customer account. The authenticity analysis can use third party information as part of the authenticity analysis, or the authentication can entail only verification by matching one or more fields of customer account information.

Communicating Between Bank and Merchant

Preferred methods according to the invention may also include communicating between the bank and merchant. In such communications the merchant is seeking assurance of payment from the bank, so that the customer order can be fully processed. The customer or merchant may submit a request seeking bank authorization, and for the bank to assure payment and/or make payment to the merchant. FIG. 3 illustrates an internet communications linkage between the merchant computer 20 and the bank computer 30. This is done via merchant internet service 18, internet 15 and the bank internet service 28.

In alternative systems and methods the merchant computer 10 may be directly connected via modem (not illustrated) to the bank computer 30. Other communications vehicles and various communications routes can be employed to provide data communications between the merchant and bank.

In some of the methods according to this invention the merchant may communicate with the bank using non-internet forms of communication. This includes the direct modem connection explained above. It is also possible to employ other direct communications between a merchant and the bank or a representative of the bank. Furthermore, it is possible to use telephone voice lines, fax communication or other non-internet communications vehicles. This is particularly advantageous in the setup phase, but also can apply to editing of setup information.

In most purchase transaction processing the merchant and bank will communicate via the internet. It may alternatively be desirable to use non-internet forms of communication between the merchant and bank in the course of a purchase transaction. The customer or bank can initiate the communication, which is preferably a data processing communications vehicle. Data concerning the proposed order and other data passed between the bank and merchant are communicated to perform the methods according to this invention.

Merchant-Bank Communications Initiation

The communications linkage between the merchant and bank computers can result from merchant initiation or bank initiation. This can be done either before or after the order file is created and/or placed. In one preferred version of the invention, the user representing a customer first builds an order file at the merchant's web site. Then the customer indicates while in communication with the merchant via the internet, that the customer wishes to pay using the bank. This is easily provided by having an internet link between the merchant's web site and the bank computer 30. This can be part of the merchant setup with the bank.

The selection of the bank using the merchant web site link or other suitable means initiates a data communications linkage between the customer and bank. This is preferably a direct connection between the customer and bank. Invitation of merchant bank communications may vary dependent upon the chosen communications approach between the customer and merchant.

In alternative methods according to the invention, the customer may indicate while at the merchant web site that the customer wants to pay using bank. Instead of the customer initiating the communications linkage with the bank, the customer's placement of the order with the merchant can result in communications being initiated between the merchant and bank. In one such procedure, The merchant communicates with the bank and indicates that the customer has placed an order that includes a request that bank is to be used to assure payment and/or make payment for the customer order. The merchant can communicate relevant information to the bank indicating the transaction control number, customer identification, amount of charges associated with the order, ordered goods or services or other information.

In response to the merchant's communication with the bank, the bank preferably initiates a communications linkage with the customer. The customer computer 10 can be contacted via the internet or by other data processing communications vehicles.

The merchant information supplied to the bank concerning the customer order includes transaction identification which is also provided to the customer computer. When the bank computer establishes communication with the customer computer, then the bank goes through an identification inquiry and verification and/or authentication processes to determine that the bank has contacted the proper customer and proper customer computer which is involved in the identified transaction with the merchant.

Bank Identification Inquiry of Merchant

A bank identification inquiry also is preferably used when the bank and merchant computers are in communication. This can be accomplished in the same manner as described with respect to the bank identification inquiry for communications with the customer.

Bank Authentication Inquiry of Merchant

A bank authentication inquiry may also be used when the bank and merchant computers are in communication. This can be accomplished in the same manner as described with respect to the bank authentication inquiry for communications with the customer.

Other Analyses by Bank for Validation of Transaction

In addition to the analyses mentioned above with regard to identification, verification or authentication, it is also preferable that the bank perform one or more supplemental validation analyses. Examples of such supplemental transaction validation analyses include analyzing the available credit or available funds in the credit or debit account to be charged.

An additional area of analysis which can be employed is transaction frequency analysis. This type of analysis looks at the frequency of a customer's use and compares it with a predetermined range or the historical frequency of use. The historical frequency can be determined over any desired prior period or periods of use of the customer account. If the frequency of use is abnormal, then validation may be refused pending further investigation to determine if the transaction for which authorization is being sought is genuine or as a result of fraud or other abusive action by unauthorized users or customer impostors.

Another supplemental validation analysis is dollar amount of transaction. This analysis can look at the dollar value of a particular transaction to help determine abusive situations. For example, a set monetary amount can be used for a particular customer account as a trigger to invalidating the purchase transaction. Alternatively, the monetary trigger may be based on historical data associated with a customer account or user. The historical data can be compiled over any desired period of time.

Determination of validity may employ a weak link conditional approach wherein certain factors are necessarily at or above a triggering limit, or within an acceptable range. If such is not found then the ruling by the bank is invalidity and the transaction is not authorized. It is also possible to use weighted factor analysis wherein one or more of the factors used to determine validity may be scaled relative to one or more other factors using fixed, predetermined or variable weight scaling factors.

Validation and Authorization of Transaction

The bank receives a request for authorization to charge a customer account in connection with an internet purchase transaction. The request for authorization also serves as a request that the bank perform a validation analysis which is the basis of the decision whether to authorize the transaction and communicate assurance of payment to the merchant to the benefit of the customer account being charged.

The request for authorization and validation can be communicated by either the merchant or customer to the direction of the bank. This can be done in a variety of suitable ways; however, communication via the internet is contemplated to be the most expedient.

The validation analysis performed by the bank can include one or more of the various analyses which have been described herein. Validation analysis by the bank can also include additional analyses which the bank deems appropriate in determining whether the proposed internet purchase transaction will be completed using the bank as a payment assurer and payment agent in favor of the assured, merchant.

The validation analysis may include analysis of the merchant, analysis of the customer, analysis of the user, analysis of third party information, and analysis of historical or other customer account information. Other analyses can also be included.

The validation analysis results in either validation of the transaction, invalidation of the transaction, or some other response indicating need for additional analysis or added information.

Communication of Assurance of Payment

If the validation analysis or additional authorization analyses performed by the bank result in a positive or valid result, then the bank communicates with the merchant and provides assurance of payment. Assurance of payment can be in various forms and formats. Acceptance of the assurance is facilitated by having the merchant set up with the bank as a participating merchant. In some forms the assurance of payment is communicated by the bank to the merchant via the internet. This can most effectively be accomplished by merely including the transaction control number, the amount authorized and an indication that the merchant's account with the bank will be credited in due course for the authorized amount.

It is also possible to send the authorization notice and assurance of payment to the merchant along with key information which has been verified. This may be transaction purchase amount, confirmation of the goods or services, and/ or delivery address information which has been verified against authorized delivery addresses for the customer account involved. The bank may make payment contingent upon or subject to revocation, if the merchant ships in a manner which is inconsistent with the key information provided in the bank assurance of payment, or in a separate communication of bank authorization. In such later case the assurance of payment may be made in a separate communication between the bank and merchant.

Shipment or Delivery

One key piece of transaction information which can be used in the bank transaction authorization or assurance of payment is the delivery address. The delivery address may be specified by the bank and shipment to any different address may result in refusal to pay or revocation of payment. The merchant is obligated in such forms of the invention to follow the bank instructions containing a delivery authorization address communicated by the bank to the merchant. This delivery authorization address may be the only address provided, or it may be a confirmation of an address provided by the customer in building the order file. Still further, it is possible for the order file to be built by contributions from both the customer and bank with the bank supplying key information, such as the delivery address using an authorized delivery address set up with the bank for the proper customer account and user.

A further alternative is that the merchant submits the planned delivery address with the request for authorization and the bank confirms after verification against the customer account that shipment to the address indicated in the request for authorization is an authorized delivery address to which the merchant may direct shipment.

Payment by Bank to Merchant

Payment by the bank to the merchant is most efficiently effected by crediting a previously set up merchant account with the bank. Alternatively, the bank can effect payment by sending checks, wire transfers, electronic funds transfers, or other known or hereafter developed methods of payment. The payment is preferably made concurrent with or after debiting the customer account to which the purchase transaction charges are to be made. Alternatively, the bank may effect payment and then charge the customer.

Billing or Charging of Customer

The customer is billed in a suitable fashion for the charges which are associated with the customer's internet purchase transactions. In the case of a credit account, the charge will be posted to the customer's account and then demand for payment is made by the bank to the customer. This can be done in a variety of ways, such as by billing the customer for the charges using a printed bill format.

Alternatively, the customer may have an account which is prepaid and has funds available for debiting to cover the purchase transaction charges. These funds can then be credited to the account of the merchant, either directly or using one or more intermediaries, such as the bank.

It is also possible that the customer may be charged and that payment is effected by the customer to the bank using another institution or payment agent which is billed using paper or electronic documentation. The payment agent then pays in behalf of the customer and the arrangements between the agent and customer may be accounts of various types and requirements.

Further Explanation of Methods According to the Invention

Figure 4:
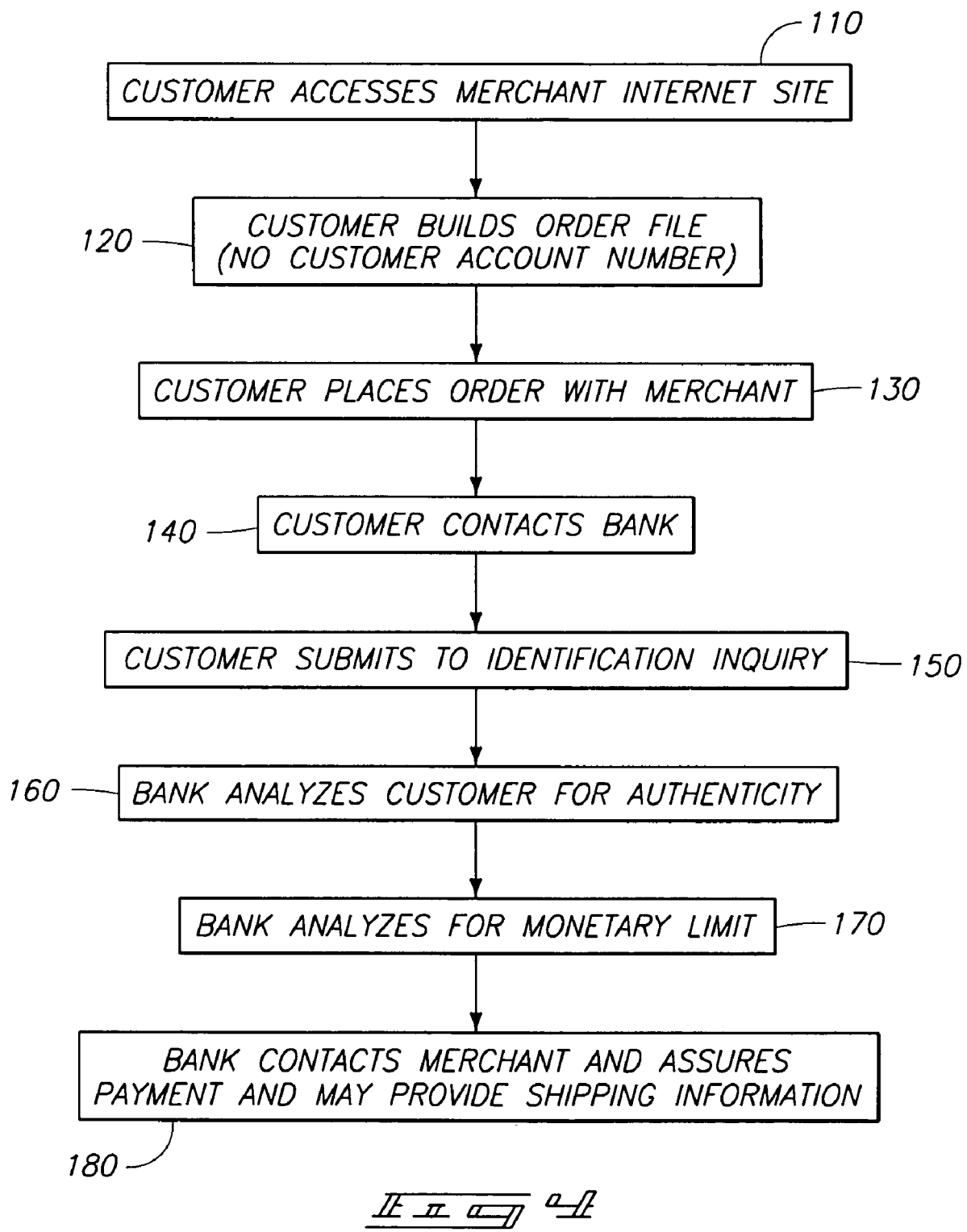
FIG. 4 is a process block diagram indicating processing steps used in a preferred embodiment of the invention.

FIG. 4 further details actions taken by the customer, merchant and bank using a preferred process and preferred configuration, such as the configuration of FIG. 3. Step 110 illustrates the customer accessing the merchant internet site for purposes of gaining information, building an order file, and/or placing an order.

Step 120 is the customer building an order file in preparation for placing an order. The order file being built by the customer may identify the customer or it may be identified solely by an order tracking number assigned by the merchant. The order file also includes identification of the items which the customer wishes to obtain. Additionally, the order file may indicate that the customer has selected to have payment provided by bank 30. However, no account number, account address, or other sensitive information is required to build the order file using the novel methods. Instead, the customer order is identified by the merchant and the desired goods and services are identified in the order file. Depending upon the specific embodiment of the invention employed, other information may be included in the order file.

Step 130 represents the customer placing the order with the merchant. The merchant can perform any desired initial processing (not illustrated), such as to determine if the order is sufficiently defined and/or complete. The set of order information fields required may indicate that the customer intends to pay using bank 30.

Step 140 represents the customer contacting the bank. This can be done via the internet or otherwise as explained herein. Upon customer communication with the bank, the customer submits to the bank identification inquiry in step 150. The bank then analyzes the customer for authenticity using one or more of the authentication or verification procedures explained herein.

FIG. 4 also shows that the bank may in step 170 additionally analyze the transaction relative to the customer account for a monetary limit. Other additional analyses as explained herein may also be performed prior to validating or invalidating the purchase transaction and responding to the request for authorization.

In the case where the transaction is validated, then step 180 illustrates that in response to the request for authorization, the bank contacts the merchant and assures payment. The bank may provide delivery or shipping instructions, or confirm instructions already given by the customer, when the bank is assuring the merchant of payment.

Thereafter the bank sends payment to the merchant and bills the customer for the charges made in the transaction. A transaction processing fee may be charged to either or both the merchant and/or customer.

Figure 5:
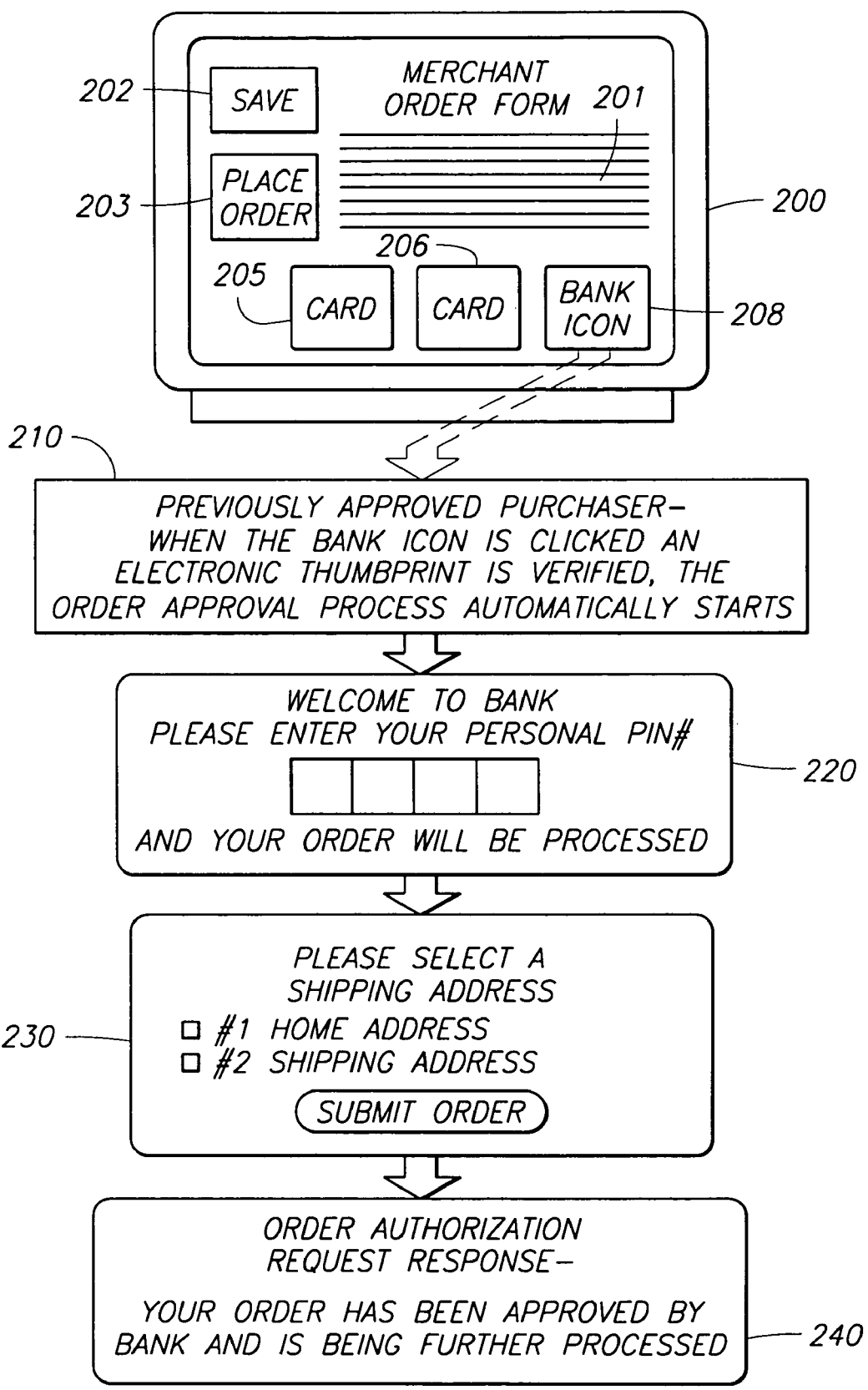
FIG. 5 is a diagram illustrating a series of exemplary screen displays during placement of an order by an existing customer account using the invention.

FIG. 5—Illustration of Established Customer Transaction

FIG. 5 illustrates a method according to the inventions. The customer computer monitor is shown as monitor 200. Displayed information is included on the monitor as shown. This advantageously includes screen order file data representatively shown as order data 201. Order data 201 is used and forms part or all of the order file for this order.

After the order data 201 has been selected by the customer, then the operational command icons for save 202 and place order 203 are displayed to allow the user to save the order file for later editing or submission. If the user is satisfied with the order data and wants to place the order, then the order placement icon 203 is clicked or otherwise operated to place the order with the merchant or bank.

The display on monitor 200 also shows 2 traditional charge account options labeled as operational icons 205 and 206. A user may click upon either of these to choose a prior art purchasing process such as described above.

Alternatively, the user is given the option of clicking on the Bank Icon 208 which activates one of several different processes according to this invention.

FIG. 5 shows a displayed message 210 indicating that the customer is an approved purchaser. The identification inquiry or inquiries explained elsewhere herein are being performed. The computer identification is conveniently referred to as an electronic thumbprint. If this authentication of the customer computer is successfully completed, then the display indicates that the order approval process automatically starts.

Display message 220 indicates that the computer identification inquiry was successfully completed. Now the displayed message prompts the user to enter the personal identification code associated with this user and customer account. The user then provides the code in the squares or in another suitable manner. Entering this information on the customer/user computer starts the process again and the personal identification process is undertaken. This is advantageously done by verifying the personal identification code field of the bank's customer record against the entered information.

Message display 230 indicates success in the prior step and the user is now being prompted to indicate whether the order is to be shipped to the user's home or business address. After the desired address is indicated, such as by clicking on screen, then the submit order command is activated and the validation and authorization procedures explained herein can be performed in various manners as described. The displayed message 240 indicates the order has been approved. The user has thus completed the interactive portion with his or her customer computer.

Figure 6:
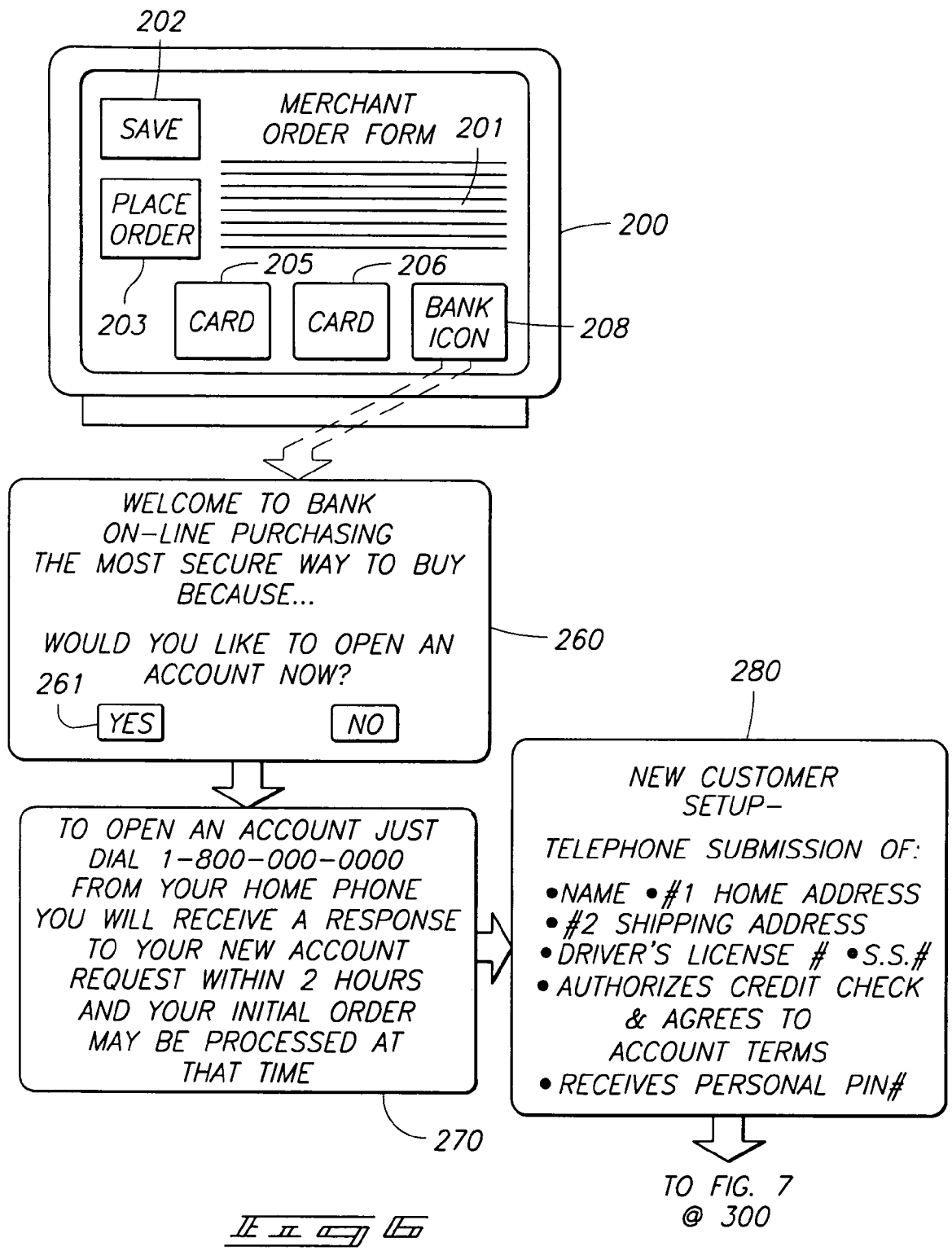
FIGS. 6 and 7 are diagrams illustrating a series of screen displays and process steps involved in an alternative form of the invention wherein a new customer is processed partly on-screen and party via telephone to effect customer set up.
Figure 7:
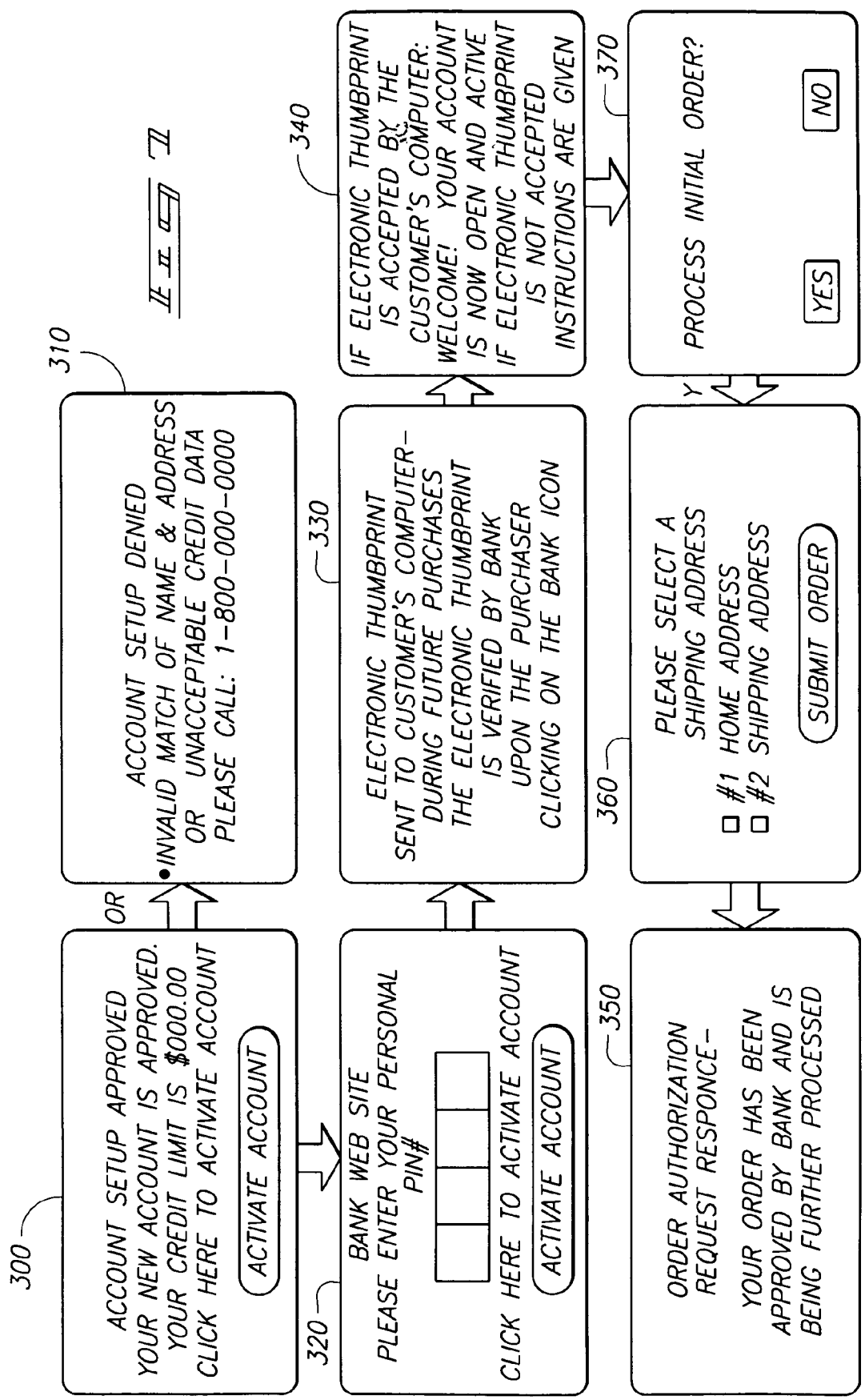

FIGS. 6 & 7—Illustration of New Customer Transaction

FIG. 6 shows another monitor 250 having a customer/user computer screen display similar to that described above with regard to monitor 200. After providing the needed order data, the user clicks on the Bank Icon 208 to start interaction with the bank. The bank seeks to find computer identification information from the user's computer but is unsuccessful and thus screen display 260 is presented. Displayed message 260 welcomes the potential new customer and queries the user whether he or she wants to open a new account with the bank. The user clicks on the "yes" operation control icon 261.

A subsequent screen display message 270 is presented in reaction to the yes command. The user is prompted to contact the bank using a specified voice telephone line. This is done to setup the customer account as variously described herein. The user/customer then performs such a setup procedure. As illustrated in representative display screen message 280, the user/customer provides the indicated information by voice explanation. The customer also agrees to the account terms and conditions. The user is also advantageously provided with the personal identification code or codes needed during this setup telephone session.

FIG. 7 shows a further screen display message 300. This message is displayed after the user contacts the bank or merchant web site to complete setup of the customer account by activating the account. Message 300 indicates the various verification and authentication processes have been performed and setup has been approved. An alternative rejection (non-approval) display message is shown is display message 310.

The displayed message 300 may also show the credit limit assigned by the bank. If the user want to proceed with account activation, then the "activate account" screen icon is clicked. In the procedure illustrated by FIGS. 6 and 7, the user has been given a personal identification code by telephone during the customer-bank setup telephone session. The user/customer then provides the requested number.

The user/customer then indicates that the activation process, as described herein, should be performed when the "activate account" icon is clicked by the user using the customer computer.

Message 330 indicates that the activation process preferably includes providing the customer computer with computer identification coding and programming as needed to act as an electronic thumbprint which can be read or otherwise decoded by the bank computer to verify or authenticate the computer in further transaction processing or account modification operations. This step can also be used to provide any needed customer interface programming.

Display message 340 indicates that the acceptance of the computer identification coding by the customer computer leads to a welcome message indicating that the customer account is activated. If the customer computer does not accept the coding and/or programming, then additional instructions (not shown) can be given.

Upon approval and activation of the customer account, the customer is then given an opportunity to continue with the initial order. The "yes" icon is clicked as screen display 370 indicates. A yes command leads to step 360 which prompts the user for the desired customer shipping address.

Screen display message 350 indicates that the order has been approved by the bank and is being further processed. Such further processing leads to the merchant also receiving approval according to the various methods described herein.

EXAMPLE A

This is one example of how the methods according to this invention can be carried out. In this example the customer and the merchant are already set up with the bank in accordance herewith. The customer contacts the merchant via the internet as described. The customer initiates communications with the merchant using a first communications link. The customer then builds the order file but does not include customer account information which is sufficient for obtaining payment, goods or services in a fraudulent transaction. Instead, the customer clicks on the bank icon set up on the merchant's web site and this links to the bank web site establishing an additional or second communications linkage therewith, advantageously using a distinct communications mode or vehicle.

The bank then performs a customer identity check such as by using bank encoded information written onto the customer computer. The bank analyzes the customer identity information and verifies that it is an active account. The user is prompted for his personal identification code and the user supplies such information. The bank verifies that the personal identification code is correct as an authorized user under the customer's account. If these factors are verified, then this serves as an authentication process indicating the authenticity of the user to use the particular customer account and authorized customer computer involved.

Further third party authentication is optionally provided by the bank performing an assessment of the caller identification information associated with the telephone line through which the customer is connected to the internet in the customer-bank communications linkage. The telephone line number information is verified against the related information contained in the bank's customer account information. If the caller identification information is verified, then additional authentication evidence is provided and the bank now completes the authentication analysis.

The customer computer then communicates to the bank computer information indicating the merchant being used in the purchase transaction. The amount to be charged to the customer for the goods and/or services are communicated to the bank. The bank then does a credit limit analysis for the customer account, and the amount requested for authorization may or may not be found acceptable.

The bank then establishes a third communications link with the merchant via the internet while the customer is in active or standby communication with the merchant. The bank performs any desired merchant identification inquiry, such as done with the customer. The bank also performs an authentication analysis by verifying that the merchant computer is an authorized merchant computer using the bank's merchant account verification information.

With the above steps performed the bank is now in a position to perform a validation analysis for the transaction. Since the merchant, customer and user identifications have been verified and the credit limit analysis has successfully been passed, then the bank determines that the transaction is valid.

The merchant, bank and customer are in this example engaged in a communications triad wherein each is communicating with the other two over the internet in an independent fashion.

The bank then communicates to both the merchant and customer that the purchase transaction has been authorized. The bank communicates assurance of payment to the merchant indicating that payment will be made to merchant's account with bank on the next business day. The merchant in many cases will accept the assurance of payment as sufficient for the merchant to proceed with shipment of the purchased goods or services.

The bank debits the customer account at or near the time the authorization is given. The bank also credits the merchant's account such as at nearly the same time or otherwise. The customer is subsequently billed for the transaction, such as on the next customer billing statement.

EXAMPLE B

In this example the customer and the merchant are already set up with the bank in accordance herewith. The customer contacts the merchant via the internet as described. The customer initiates communications with the merchant using a first communications link. The customer then builds the order file but does not include customer account information sufficient to authorize goods, services or for receiving payment. Instead, the customer saves the order file with the merchant and maintains a record of the order file contents on the user's computer. The record of the order file includes merchant identification information, transaction identification, and an indication of the amount to be charged to the customer's account. The customer then discontinues communications with the merchant via the internet.

The customer thereafter initiates communications with the bank, such as via the internet. The user is prompted for his personal identification (ode and the user supplies such information. The bank performs the desired identification inquiry by comparing the user's personal identification (ode to the customer account information for this field. The bank also performs customer computer identification analysis using specially coded information contained on the user's authorized computer. The bank then analyzes the customer identity information and verifies that it is an active account. The bank verifies that the personal identification (ode is correct as an authorized user under the customer's account.

The user's computer includes bank programming which has an encryption key which varies as a function of the information previously written to the customer's computer by the bank, the time and date, and the number of transactions conducted by the customer with the bank. The bank then authenticates the user and customer computer using such analyses. If these factors are successfully verified, then this serves as an authentication analysis indicating the authenticity of the user to use the customer account.

Further third party authentication is optionally provided by the bank performing an assessment of the caller identification information associated with the telephone line through which the customer is connected to the internet in the customer-bank communications linkage. The telephone line number information is verified against the related information contained in the bank's customer account information. If the caller identification information is verified, then additional authentication evidence is provided and the bank now has completed the authentication analysis of the user and customer account.

The customer computer then communicates to the bank computer information indicating the merchant being used in the purchase transaction and the transaction control number. The amount to be charged to the customer for the goods and/or services are also communicated to the bank. The bank then does a credit limit analysis for the customer account, and the amount requested for authorization is acceptable. The bank communicates to the user that the transaction is processing.

The bank then establishes a communications link with the merchant via the internet while the customer is in active or standby communications with the merchant. The bank performs any desired merchant identification inquiry, such as done with the customer. The bank also performs an authentication analysis by verifying that the merchant computer is an authorized merchant computer using the bank's merchant account computer identification verification information.

With the above steps performed the bank is now in a position to perform a validation analysis for the transaction. Since the merchant, customer and user identifications have been verified and the credit limit analysis has successfully been passed, then the bank determines that the transaction is valid.

The bank is simultaneously engaged with the merchant and customer but the customer and merchant are not in active communication. The bank then communicates to both the merchant and customer that the purchase transaction has been authorized. The bank communicates assurance of payment to the merchant indicating that payment will be made to merchant's account with bank by the next business day. The merchant accepts the assurance of payment as sufficient for the merchant to proceed with shipment of the purchased goods.

The bank debits the customer account at the time the authorization is given. The bank also credits the merchant's account at nearly the same time. The customer is subsequently billed for the transaction on the next customer billing statement.

EXAMPLE C

In this example the customer and the merchant are already set up with the bank in accordance herewith. The customer contacts the merchant via the internet as described. The customer initiates communications with the merchant using a first communications link. The customer then builds the order file but does not include sensitive customer account information. Instead, the customer saves the order file with the merchant and maintains a record of the order file on the user's computer.

The record of the order file includes customer and merchant identification information, transaction identification, an indication of the amount to be charged to the customer's account, an indication that the bank is being used to assure payment, and other information specifying essential and desired key information for the order being placed. The customer then places the order with the merchant via the internet.

The merchant thereafter initiates communications with the bank, such as via the internet. Information concerning the order file is in part or in whole communicated to the bank along with a request for authorization.

The bank then initiates communication with the customer, such as via the internet. The user is prompted for his personal identification code and the user supplies such information. The bank performs the desired identification inquiry by comparing the user's personal identification code to the customer account information for this information field. The bank also performs customer computer identification analysis using specially coded information contained on the user's authorized computer. The bank then analyzes the customer identity information and verifies that it is an active account. The bank verifies that the personal identification code is correct as an authorized user under the customer's account.

The user's computer includes bank interface programming which has an encryption key which varies as a function of the information previously written to the customer's computer by the bank, the time and date, and the number of transactions conducted by the customer with the bank. The bank then authenticates the user and customer computer using such analyses. If these factors are successfully verified, then this serves as an authentication analysis indicating the authenticity of the user to use the customer account.

Further third party authentication is optionally provided by the bank performing an assessment of the caller identification information associated with the telephone line through which the customer is connected to the internet in the customer-bank communications linkage. The telephone line number information is verified against the related information contained in the bank's customer account information. If the caller identification information is verified, then additional authentication evidence is provided and the bank now has completed the authentication analysis of the user and customer account.

The customer computer then communicates to the bank computer information indicating the merchant being used in the purchase transaction and the transaction control number. The amount to be charged to the customer for the goods and/or services are also communicated to the bank. The bank then does a credit limit analysis for the customer account, and the amount requested for authorization is acceptable. The bank communicates to the user that the transaction is processing.

The bank then establishes a communications link with the merchant via the internet while the customer is in active or standby communication with the merchant. The bank performs any desired merchant identification inquiry, such as done with the customer. The bank also performs an authentication analysis by verifying that the merchant computer is an authorized merchant computer using the bank's merchant account verification information.

With the above steps performed the bank is now in a position to perform a validation analysis for the transaction. Since the merchant, customer and user identifications have been verified and the credit limit analysis has successfully been passed, then the bank determines that the transaction is valid.

The bank is simultaneously engaged with the merchant and customer but the customer and merchant are no longer in active communication. The bank then communicates to both the merchant and customer that the purchase transaction has been authorized. The bank communicates assurance of payment to the merchant indicating that payment will be made to merchant's account with bank by the next business day. The merchant accepts the assurance of payment as sufficient for the merchant to proceed with shipment of the purchased goods.

The bank debits the customer account at the time the authorization is given. The bank also credits the merchant's account at nearly the some time. The customer is subsequently billed for the transaction on the next billing statement.

Alternative Representation of Customer by Purchasing Agent

The methods according hereto can also be practiced wherein the customer is represented by a buying agent. The buying agent can be a more traditional type buying agent whereby the customer appoints and authorizes the buying agent. Alternatively, the buying agent may be a computer service vested with various techniques for securing the most favorable purchasing on behalf of the customer.

Alternative Representation of Merchant by Selling Agent

The methods according hereto can also be practiced wherein the merchant is represented by a selling agent. The selling agent can be a more traditional type selling agent whereby the customer appoints and effectively authorizes the selling agent. Alternatively, the selling agent may be a computer service vested with various techniques for securing the most favorable selling price in behalf of the merchant.

Bank Functions May be Divided or Substituted

The description given herein is made as if the bank is a single legal entity. However, the functions of the bank may instead be performed by an agent or various agents which assume some or all of the bank's responsibilities and functions in accordance with the inventions. For example, the bank may have several subsidiary or sister corporations which perform some or all of the functions instead of or in support of the bank's performance of the methods according hereto.

Alternative Quick Setup and Related Purchase Transaction

In still another alternative method according to the invention a potential customer is both setup and given credit in a series of steps preferably performed as explained below.

The procedure applies to certain situations wherein a new customer is more quickly set up to facilitate nearly immediate use of the customer account. The context of the procedure is explained with regard to a customer accessing a merchant web site for a merchant that is set up with a merchant account at the bank in accordance with the invention. The screen display at the merchant web site is provided with an icon or other indication that the merchant is a bank authorized merchant and that payment can be made employing the bank.

If a potential new customer clicks on the bank icon or otherwise indicates that the customer wants to set up a customer account with the bank, then the setup procedure is initiated. This can initially involve establishing a communications link between the customer and bank. Preferably, the initial setup communications link is via telephone voice line between the customer telephone and the bank setup telephone.

Alternatively, the potential customer may make some initial communications link via the internet in response to the potential customer's indication that it would like to set up an account with the bank.

The methods thus advantageously also include prompting the potential customer to call the bank setup telephone number. The bank setup telephone number can be a toll-free number, for example 1-800-000-0000. The prompting of the potential customer involves providing the potential customer with the telephone number to be used. The prompting also preferably includes instructing the potential customer that the telephone to be used in the voice telephone setup contact be the customer's or user's home number, or other customer telephone number that will be used in future communications sessions with the bank and/or merchants. Such customer or user telephone line is for convenience called the designated customer or user telephone line.

The prompting also preferably includes explaining that this designated telephone line is also preferably a telephone line which has caller identification information available concerning the customer or user, and that such caller identification information is not in a blocked status. This is desired since in at least some of the preferred methods the telephone caller identification information is used by the bank in processing requests for setup, setup modification and requests for authorization to charge.

The potential customer then proceeds by telephoning or otherwise communicating in a setup mode communications linkage with the bank setup telephone line. The preferred setup mode communications linkage is a customer voice telephone line communicating with a bank voice telephone line.

The methods also include establishing the setup mode communications linkage between the potential customer and the bank setup communications line.

The methods further preferably include providing some or all of the customer account setup information by voice or other communications mode which is preferably not via the internet. The providing of customer account information will typically include voice communication of customer information such as explained above in connection with typical setup procedures.

The quick setup methods further employ a quick setup authenticating step or steps performed while the potential customer is in the setup mode on-line communications linkage with the bank. A preferred mode of quick setup authentication is to use a pre-existing charge card which can be checked for validity and credit limit quickly while the potential customer is on the telephone with the bank setup department. Alternatively, the bank may have rapid processing access to a credit report or abbreviated credit report to use in lieu of or in addition to using the pre-existing account information. This could be bank-originated information or third-party originated information.

The quick or instant setup procedure speeds setup by providing to the potential customer a setup option wherein the customer provides credit authentication information which can be immediately accessed by the bank and used to provide setup approval and authorization for credit using the customer account with the bank. One example of such credit authentication information is the indicated pre-existing credit card. Other quickly accessible customer authentication and credit information may also be alternatively used.

In this process the customer provides via the voice telephone line or other setup communications linkage, an indication of the bank card customer account number, customer name and expiration date, similar to making a charge over the phone using the pre-existing credit card. The bank then utilizes conventional technology to seek authorization to charge the potential customer's pre-existing charge account. The authorization request to the pre-existing charge card account may or may not result in an actual charge to the pre-existing account.

Full setup of the customer account with the bank may be subsequently completed, yet the quick setup procedure will allow an initial transaction or transactions to be approved by the bank against the new customer's account.

When using the quick setup procedure, the bank will typically limit the credit amount to a low initial value until the full setup procedure can subsequently be completed. At that time the bank may indicate that additional credit is available beyond the quick setup credit limit given.

After the new customer has been approved using the quick setup procedure, then the steps for activation and use will be the same as those described above.

Alternative Process With Assurance to New Merchant

The quick or instant credit procedure described above can also be used in the context of quick set up of a new merchant account in the same or an analogous manner to that described above in connection with quick set up of a new customer account. For example, the merchant can use the merchant's pre-existing bank card, e.g. a MASTERCARD™. This can be used to authenticate the merchant to allow a merchant account to be established with the bank on a quick basis similar to the quick set up procedure for customers described above. Subsequent completion of the full setup procedure is preferred.

Further Explanation Concerning Aspects of the Invention

The invention may reside in an individual feature or features or in combinations of features as set out herein in summarized and exemplary forms. Although every novel combination has not been individually discussed, it must be understood that the various features, combinations, subcombinations and functions recited herein are appropriately combined with one or more of the other such features, combinations, subcombinations and functions to serve as bases for claiming of patent protection on this invention.

Further Indication of Aspects of the Invention

The invention can be considered in a number of different combinations and subcombinations. Exemplary combinations and subcombinations are set out below. It should be appreciated that additional combinations and subcombinations can also be defined consistent with the description given herein.

A method for conducting a purchase of goods or services over the internet, the purchase being made by a customer using a merchant for goods or services which are to be provided at a delivery location, and wherein a bank assures payment to the merchant for said purchase, comprising— creating a customer account with the bank, said customer account being associated with said customer; the customer account also having:
customer computer identification information associating said customer account with at least one authorized customer computer which is identifiable by the bank;
customer delivery address information associating said customer account with at least one authorized customer delivery address;
creating a merchant account, said merchant account being associated with said merchant; said merchant having a merchant internet site at which the merchant offers goods or services;
displaying to the customer on the merchant internet site indicia which indicates customers can choose to pay the merchant using said bank;
detecting when a customer chooses to pay the merchant using said bank;
obtaining computerized order information placed from an ordering computer which indicates an order for chosen goods or services being sought for purchase by the customer using the merchant; said obtaining computerized order information including:
obtaining an order delivery address indicating a location for the delivery of the goods or services associated with the order;
obtaining ordering computer identification information from the ordering computer;
verifying said order delivery address by comparing said order delivery address to said customer delivery address information kept by the bank to assure it is an authorized customer delivery address;
verifying said ordering computer identification information from the ordering computer by comparing said ordering computer identification information to said customer computer identification information kept by the bank to assure it is an authorized customer computer;
communicating assurance of payment to the merchant in connection with said order upon successful verification of said order delivery address and said ordering computer identification information.

A method for conducting a purchase of goods or services over the internet, the purchase being made by a customer using a merchant via a merchant internet site selling goods or services to be provided at a delivery location, and wherein a bank assures payment to the merchant for said purchase, comprising— creating a customer account with the bank, said customer account being associated with said customer; the customer account also having:
customer computer identification information associating said customer account with at least one authorized customer computer which is identifiable by the bank;
customer delivery address information associating said customer account with at least one authorized customer delivery address;
detecting when a customer chooses to pay the merchant using said bank;
obtaining computerized order information placed from an ordering computer which indicates an order for chosen goods or services being sought for purchase by the customer using the merchant; said obtaining computerized order information including:
recording an order delivery address indicating a location for the delivery of the goods or services associated with the order;
obtaining computer identification information from the ordering computer;
verifying said order delivery address by comparing said order delivery address to said authorized delivery address information kept by the bank;
verifying that said computer identification information from the ordering computer is from an authorized customer computer associated with said customer account;
communicating assurance of payment to the merchant in connection with said order upon successful verification of said order delivery address and said computer identification information.

A method for conducting a purchase of goods or services over the internet, the purchase being made by a customer using a merchant, said merchant having an internet site at which the merchant offers goods or services; and wherein a bank assures payment to the merchant, comprising— creating a customer account with the bank that is associated with said customer;
providing the customer account with customer account information associated therewith which includes:
authorized user identification information associating said customer account with at least one authorized user identification code;
customer computer identification information associating said customer account with at least one authorized customer computer, said at least one authorized customer computer being identifiable by the bank;
detecting when said customer chooses to pay the merchant using said bank;
recording information indicating the customer has placed an order which seeks to obtain using the merchant ordered goods or services;
obtaining computer identification information about an ordering computer from which said order has been placed;
verifying said computer identification information is from an authorized customer computer associated with the customer account;
recording user identification code information provided by a user of the order computer when placing said order;
verifying said user identification code information by comparing the user identification code information so provided in comparison to authorized user identification codes associated with the customer account;
communicating assurance of payment to the merchant upon successful verification of said computer identification information and said user identification code information.

A method for authorizing a purchase of goods or services over the internet, the purchase being made by a customer using a merchant, said merchant having an internet site at which the merchant offers goods or services; and wherein a bank authorizes the purchase and assures payment to the merchant, comprising:

detecting when a customer chooses to pay the merchant using said bank;

obtaining order information indicating the customer has placed an order which seeks to obtain goods or services using the merchant;

obtaining information about an order computer from which said order has been placed;

accessing customer verification information which includes authorized customer computer information which indicates one or more computers which have been authorized for use in placing orders;

verifying said order computer used in placing the order is an authorized customer computer;

communicating to the merchant assurance of payment information upon successful verification in said verifying step.

A method for conducting a purchase of goods or services over the internet, the purchase being made by a customer using a merchant for goods or services which are to be provided at a delivery location, and wherein a bank assures payment to the merchant for said purchase, comprising— creating a customer account with the bank, said customer account being associated with said customer; the customer account having verification information contained therein, said verification information including information about at least one of the following verification parameters:

customer delivery address information associating said customer account with at least one authorized customer delivery address;

customer computer identification information associating said customer account with at least one authorized customer computer which is identifiable by the bank;

authorized user identification information associating said customer account with at least one authorized user identification code; or, authorized telephone caller identification information including at least one authorized telephone caller identification code;

creating a merchant account, said merchant account being associated with said merchant; said merchant having a merchant internet site at which the merchant offers goods or services;

detecting when a customer chooses to pay the merchant using said bank;

communicating to the bank computerized order information originating in connection with an order for chosen goods or services being sought using the merchant by a user from an ordering computer;

said step of communicating to the bank being performed in connection with obtaining computerized information about at least one of the following verification variables:

an order delivery address indicating a location for the delivery of the goods or services associated with the order;

ordering computer identification information obtained from the ordering computer;

ordering user identification information obtained from the ordering user when the order is placed;

ordering telephone caller identification information obtained when the order is placed;

validating said order by the bank using said computerized order information and the verification information kept by the bank in connection with said customer account;

communicating assurance of payment to the merchant in connection with said order upon successful validation of said order.

A method for conducting a purchase of goods or services over the internet, the purchase being made by a customer using a merchant for goods or services which are to be provided at a delivery location, and wherein a bank assures payment to the merchant for said purchase, comprising— creating a customer account with the bank, said customer account being associated with said customer; the customer account having verification information contained therein, said verification information including information about at least one of the following verification parameters:

customer delivery address information associating said customer account with at least one authorized customer delivery address;

customer computer identification information associating said customer account with at least one authorized customer computer which is identifiable by the bank;

authorized user identification information associating said customer account with at least one authorized user identification code; or, authorized telephone caller identification information including at least one authorized telephone caller identification code;

detecting when a customer chooses to pay the merchant using said bank;

communicating to the bank computerized order information originating in connection with an order for chosen goods or services being sought using the merchant by a user from an ordering computer;

said step of communicating to the bank being performed in connection with obtaining computerized information about at least one of the following verification variables:

an order delivery address indicating a location for the delivery of the goods or services associated with the order;

ordering computer identification information obtained from the ordering computer;

ordering user identification information obtained from the ordering user when the order is placed;

ordering telephone caller identification information obtained when the order is placed;

qualifying said order by the bank using said computerized order information and the verification information kept by the bank in connection with said customer account;

communicating assurance of payment to the merchant in connection with said order upon successful qualification of said order.

A method for purchasing of goods or services and assuring payment over the internet, the purchase being made by a customer using a merchant, said merchant having an internet site at which the merchant offers goods or services; and wherein a bank authorizes the purchase and assures payment to the merchant, comprising:

obtaining computerized order information indicating a customer desires to place an order which seeks to obtain goods or services using the merchant;

communicating the order information to the merchant;

providing customer information to the bank in connection with said order information;

accessing customer verification information by the bank, said customer verification information being previously set up by the customer with the bank;

verifying that the customer order information provided in connection with said order information is associated with said customer;

verifying that order delivery address information is an authorized delivery address associated with the customer;

providing delivery address information to the merchant in connection with said order;

communicating from the bank to the merchant assurance of payment information upon successful verification in said verifying steps.

A method for facilitating purchasing of goods or services and assuring payment over the internet, the purchase being made by a customer using a merchant, said merchant having an internet site at which the merchant offers goods or services; and wherein a bank validates the purchase and assures payment to the merchant, comprising:

telephoning the bank by the customer using a caller identification phone line associated with the customer;

providing the bank with customer account information from the customer using said caller identification phone line;

verifying that the customer account information given from the customer using the caller identification phone line is consistent with account setup verification information which includes the caller identification information available when the customer uses the caller identification phone line;

creating a customer account with the bank, said customer account being associated with said customer and having customer account information including customer account verification information;

obtaining order information indicating a customer desires to place an order which seeks to obtain goods or services using the merchant;

delivering the order information to the merchant;

providing customer information to the bank in connection with said order information;

accessing customer verification information by the bank, said customer verification information being previously set up by the customer with the bank;

verifying that the customer order information provided in connection with said order information is associated with said customer;

communicating from the bank to the merchant assurance of payment information upon successful verification in said verifying steps.

A method performed by a bank for processing a purchase of goods or services over the internet, the purchase being made by a customer using a merchant via a merchant internet site selling goods or services to be provided at a delivery location, and wherein the bank assures payment to the merchant for said purchase, comprising— creating a customer account with the bank, said customer account being associated with said customer; the customer account also having:
  customer computer identification information associating said customer account with at least one authorized customer computer which is identifiable by the bank;
  customer delivery address information associating said customer account with at least one authorized customer delivery address;
detecting when a customer chooses to pay the merchant using said bank;
obtaining computerized order information placed from an ordering computer which indicates an order for chosen goods or services being sought for purchase by the customer using the merchant; said obtaining computerized order information including:
  receiving an order delivery address indicating a location for the delivery of the goods or services associated with the order;
  obtaining computer identification information from the ordering computer;
verifying said order delivery address by comparing said order delivery address to said authorized delivery address information kept by the bank;

verifying that said computer identification information from the ordering computer is from an authorized customer computer associated with said customer account;

communicating assurance of payment to the merchant in connection with said order upon successful verification of said order delivery address and said computer identification information.

A method performed by a bank for processing a purchase of goods or services over the internet, the purchase being made by a customer using a merchant, said merchant having an internet site at which the merchant offers goods or services; and wherein a bank assures payment to the merchant, comprising— creating a customer account with the bank that is associated with said customer;

providing the customer account with customer account information associated therewith which includes:
  authorized user identification information associating said customer account with at least one authorized user identification code;
  customer computer identification information associating said customer account with at least one authorized customer computer, said at least one authorized customer computer being identifiable by the bank;
detecting when said customer chooses to pay the merchant using said bank;
recording information indicating the customer has placed an order which seeks to obtain using the merchant ordered goods or services;
obtaining computer identification information about an ordering computer from which said order has been placed;
verifying said computer identification information is from an authorized customer computer associated with the customer account;
recording user identification code information provided by a user of the order computer when placing said order;
verifying said user identification code information by comparing the user identification code information so provided in comparison to authorized user identification codes associated with the customer account;
communicating assurance of payment to the merchant upon successful verification of said computer identification information and said user identification code information.

A method performed by a bank for authorizing a purchase of goods or services over the internet, the purchase being made by a customer using a merchant, said merchant having an internet site at which the merchant offers goods or services; and wherein a bank authorizes the purchase and assures payment to the merchant, comprising:

detecting by the bank when a customer chooses to pay the merchant using said bank;

obtaining by the bank order information indicating the customer has placed an order which seeks to obtain goods or services using the merchant;

obtaining by the bank information about an order computer from which said order has been placed;

accessing customer verification information which includes authorized customer computer information which indicates one or more computers which have been authorized for use in placing orders;

verifying said order computer used in placing the order is an authorized customer computer;

communicating from the bank to the merchant assurance of payment information upon successful verification in said verifying step.

A method for a bank authorizing a purchase of goods or services and assuring payment over the internet, the purchase being made by a customer using a merchant, said merchant having an internet site at which the merchant offers goods or services; and wherein a bank authorizes the purchase and assures payment to the merchant, comprising:

detecting by the bank when a customer chooses to pay the merchant using said bank;

obtaining by the bank order information indicating the customer has placed an order which seeks to obtain goods or services using the merchant;

obtaining by the bank order information about an order computer from which said order has been placed;

obtaining by the bank order information about an order delivery address to which said order is to be sent;

accessing customer verification information which includes authorized customer computer information which indicates one or more computers which have been authorized for use in placing orders;

verifying said order computer used in placing the order is an authorized customer computer;

verifying said order delivery address is an authorized customer delivery address;

communicating from the bank to the merchant assurance of payment information upon successful verification in said verifying steps.

A method performed by a bank for authorizing a purchase of goods or services and assuring payment over the internet, the purchase being made by a customer using a merchant, said merchant having an internet site at which the merchant offers goods or services; and wherein a bank authorizes the purchase and assures payment to the merchant, comprising:

detecting by the bank when a customer chooses to pay the merchant using said bank;

obtaining by the bank order information indicating the customer has placed an order which seeks to obtain goods or services using the merchant;

obtaining by the bank order information about an order computer from which said order has been placed;

obtaining by the bank order information about an order delivery address;

accessing customer verification information which includes authorized customer computer information which indicates one or more computers which have been authorized for use in placing orders;

verifying said order computer used in placing the order is an authorized customer computer;

verifying said order delivery address is an authorized customer delivery address;

communicating from the bank to the merchant an authorized delivery address and assurance of payment information upon successful verification in said verifying steps.

A method performed by a bank for authorizing a purchase of goods or services and assuring payment over the internet, the purchase being made by a customer using a merchant, said merchant having an internet site at which the merchant offers goods or services; and wherein a bank authorizes the purchase and assures payment to the merchant, comprising:

detecting by the bank when a customer chooses to pay the merchant using said bank;

obtaining by the bank order information indicating the customer has placed an order which seeks to obtain goods or services using the merchant;

obtaining by the bank order telephone caller identification information from which said order has been placed;

accessing customer verification information which includes authorized customer computer information which indicates one or more computers which have been authorized for use in placing orders;

verifying said order computer used in placing the order is an authorized customer computer;

verifying said order telephone caller identification information is an authorized customer telephone caller identification;

communicating from the bank to the merchant an assurance of payment information upon successful verification in said verifying steps.

A method performed by a bank for authorizing a purchase of goods or services over the internet, the purchase being made by a customer using a merchant for goods or services which are to be provided at a delivery location, and wherein a bank assures payment to the merchant for said purchase, comprising— creating a customer account with the bank, said customer account being associated with said customer; the customer account having verification information contained therein, said verification information including information about at least one of the following verification parameters:

customer delivery address information associating said customer account with at least one authorized customer delivery address;

customer computer identification information associating said customer account with at least one authorized customer computer which is identifiable by the bank;

authorized user identification information associating said customer account with at least one authorized user identification code; or, authorized telephone caller identification information including at least one authorized telephone caller identification code;

detecting by the bank when a customer chooses to pay the merchant using said bank;

obtaining by the bank computerized order information originating in connection with an order for chosen goods or services being sought by a user from an ordering computer;

said step of obtaining by the bank computerized order information being performed in connection with obtaining computerized information about at least one of the following verification variables:

an order delivery address indicating a location for the delivery of the goods or services associated with the order;

ordering computer identification information obtained from the ordering computer;

ordering user identification information obtained from the ordering user when the order is placed;

ordering telephone caller identification information obtained when the order is placed;

validating said order by the bank using said computerized order information and the verification information kept by the bank in connection with said customer account;

communicating from the bank to the merchant assurance of payment upon successful validation of said order.

A method performed by a merchant for conducting a purchase of goods or services over the internet, the purchase being made by a customer using the merchant for goods or services which are to be provided at a delivery location, and wherein a bank assures payment to the merchant for said purchase, comprising— displaying to the customer on the merchant internet site indicia which indicates customers can choose to pay the merchant using said bank;

detecting when a customer chooses to pay the merchant using said bank;

obtaining computerized order information placed from an ordering computer which indicates an order for chosen goods or services being sought for purchase by the customer using the merchant; said obtaining computerized order information including:

obtaining an order delivery address indicating a location for the delivery of the goods or services associated with the order;

obtaining ordering computer identification information from the ordering computer;

submitting said order delivery address to the bank for verification of said order delivery address kept by the bank to assure it is an authorized customer delivery address;

verifying said ordering computer identification information from the ordering computer by comparing said ordering computer identification information to said customer computer identification information kept by the bank to assure it is an authorized customer computer;

receiving assurance of payment from the bank to the merchant in connection with said order upon successful verification of said order delivery address and said ordering computer identification information.

A method performed by a customer for conducting a purchase of goods or services over the internet, the purchase being made by a customer using a merchant for goods or services which are to be provided at a delivery location, and wherein a bank assures payment to the merchant for said purchase, comprising— creating a customer account with the bank, said customer account being associated with said customer; the customer account having verification information contained therein, said verification information including information about at least one of the following verification parameters:

customer delivery address information associating said customer account with at least one authorized customer delivery address;

customer computer identification information associating said customer account with at least one authorized customer computer which is identifiable by the bank;

authorized user identification information associating said customer account with at least one authorized user identification code; or, authorized telephone caller identification information including at least one authorized telephone caller identification code;

detecting when a customer chooses to pay the merchant using said bank;

communicating from the customer to the bank computerized order information originating in connection with an order for chosen goods or services being sought using the merchant by a user from an ordering computer;

said step of communicating from the customer to the bank being performed in connection with computerized information about at least one of the following verification variables:

an order delivery address indicating a location for the delivery of the goods or services associated with the order;

ordering computer identification information obtained from the ordering computer;

ordering user identification information obtained from the ordering user when the order is placed;

ordering telephone caller identification information obtained when the order is placed.

A method for establishing a customer account with a bank which is used to pay merchants in connection with internet purchase transactions for goods or services, comprising:

creating a customer account with the bank, said customer account being associated with said customer and having customer account information; said customer account information including customer computer identification information associating said customer account with at least one authorized customer computer which is identifiable by the bank while the customer is in communication over the internet.

A method for establishing a customer account with a bank which is used to pay merchants in connection with internet purchase transactions for goods or services, comprising:

telephoning the bank by the customer using a caller identification phone line associated with the customer;

providing the bank with customer account information from the customer using said caller identification phone line;

verifying that the customer account information given from the customer using the caller identification phone line is consistent with account setup verification information which includes the caller identification information available when the customer uses the caller identification phone line;

creating a customer account with the bank, said customer account being associated with said customer and having customer account information; said customer account information including customer computer identification information associating said customer account with at least one authorized customer computer which is identifiable by the bank while the customer is in communication over the internet.

A method for establishing a customer account with a bank which is used to pay merchants in connection with internet purchase transactions for goods or services, comprising:

telephoning between the bank and the customer to provide oral explanation of customer account information using a caller identification phone line associated with the customer, said oral explanation of customer account information including:

customer name information;

at least one authorized customer delivery address;

at least one authorized user identification code;

verifying that the customer account information given from the customer using the caller identification phone line is consistent with account setup verification information which includes the caller identification information available when the customer uses the caller identification phone line;

creating a customer account with the bank, said customer account being associated with said customer and having customer account information; said customer account information including:

customer computer identification information associating said customer account with at least one authorized customer computer which is identifiable by the bank while the customer is in communication over the internet;

customer delivery address information associating said customer account with at least one authorized customer delivery address;

authorized user identification information associating said customer account with at least one authorized user identification code.

A method for purchasing of goods or services and assuring payment over the internet, the purchase being made by a customer using a merchant, said merchant having an internet site at which the merchant offers goods or services; and wherein a bank authorizes the purchase and assures payment to the merchant, comprising:

obtaining order information indicating a customer desires to place an order which seeks to obtain goods or services using the merchant;

delivering the order information to the merchant;

providing customer verification information to the bank;

accessing customer verification information by the bank, said customer verification information being previously set up with the bank;

verifying that the order information is associated with the customer using the customer verification information;

providing delivery address information to the merchant from the bank in connection with said order;

communicating from the bank to the merchant assurance of payment information upon successful verification in said verifying step.

A method for purchasing of goods or services and assuring payment over the internet, the purchase being made by a customer using a merchant, said merchant having an internet site at which the merchant offers goods or services; and wherein a bank authorizes the purchase and assures payment to the merchant, comprising:

obtaining by the bank computerized order information indicating a customer desires to place an order which seeks to obtain goods or services using the merchant;

communicating the at least some of the order information from the bank to the merchant;

providing customer information to the bank in connection with said order information;

accessing customer verification information by the bank, said customer verification information being previously set up by the customer with the bank;

verifying that the customer order information provided in connection with said order information is associated with said customer;

verifying that order delivery address information is an authorized delivery address associated with the customer;

providing delivery address information to the merchant in connection with said order;

communicating from the bank to the merchant assurance of payment information upon successful verification in said verifying steps.

A method for purchasing of goods or services and assuring payment over the internet, the purchase being made by a customer using a merchant, said merchant having an internet site at which the merchant offers goods or services; and wherein a bank authorizes the purchase and assures payment to the merchant, comprising:

obtaining order information indicating a customer desires to place an order which seeks to obtain goods or services using the merchant;

delivering a first portion of the order information to the merchant using a customer computer;

delivering a second portion of the order information to the merchant via a bank computer;

providing customer information to the bank in connection with said order information;

accessing customer verification information by the bank, said customer verification information being previously set up by the customer with the bank;

verifying that the customer information provided in connection with said order information is associated with said customer;

communicating from the bank to the merchant assurance of payment information upon successful verification in said verifying step.

A method for validating a purchase of goods or services over the internet, the purchase being made by a customer using a merchant, said merchant having an internet site at which the merchant offers goods or services; and wherein a bank authorizes the purchase and assures payment to the merchant, comprising:

detecting when a customer chooses to pay the merchant using said bank;

obtaining order information indicating the customer has placed an order which seeks to obtain goods or services using the merchant;

obtaining information about an order computer from which said order has been placed;

accessing customer verification information which includes authorized customer computer information which indicates one or more computers which have been authorized for use in placing orders;

verifying said order computer used in placing the order is an authorized customer computer;

validating the order.

General and Interpretational Explanation

Various forms and aspects of the invention have been described. It should be understood that the invention may in alternative forms include one or more of the aspects or features shown in one embodiment implemented into another embodiment. Thus the various combinations of features shown herein can be combined in such alternative ways to further set out alternative forms of the invention.

The invention has been described in compliance with the disclosure requirements. In doing so the invention has necessarily been described in language more or less specific as to structural and methodical features. However, it is understood that the invention is not necessarily limited to the specific features shown and described, since the features and methods disclosed herein comprise preferred forms of putting the invention into effect, and cannot describe all options for implementation. The invention is, therefore, claimed in its various forms or modifications to the full extent allowed by law.

The invention claimed is:

1. A method for transferring funds in connection with purchasing over the internet by a customer using a merchant having an internet site at which the merchant offers goods and/or services; and wherein a bank authorizes the purchase in association with a customer account and pays the merchant, comprising:

communicating between a customer computer used by a customer user and a merchant computer via the internet including a plurality of available order variables;

building a customer order file which contains a plurality of customer order variables;

building a merchant order file which does not include all of said plurality of customer order variables, such that the merchant has incomplete order information;

said communication, said building a customer order file and said building a merchant order file steps being performed without communicating a customer account number or similar customer account identification via the internet which may be used to make fraudulent charges against the customer account; assigning o transaction identifier, said transaction identifier not being useful for making other transactions against the customer account;

communicating between the customer computer and bank computer via the internet involving the customer order file;

conducting an identification inquiry between the bank computer and customer computer to verify the authenticity of the customer user as acceptable for conducting transactions against said customer account;

communicating between the customer computer and bank computer via the internet to provide at least one customer order variable not provided to the merchant in said building a merchant order file and said transaction identifier;

authorizing by the customer computer to the bank computer a purchase transaction based upon said customer order information and including said transaction identifier, merchant identification and at least one customer order variable not known by the merchant from said building a merchant order file;

communicating between the bank computer and the merchant computer with the bank computer providing said transaction identifier and said at least one order variable which is not included in the merchant order file;

providing in said communicating between the bank computer and the merchant computer said transaction identifier and said at least one customer order variable not provided to the merchant in said building a merchant order file needed by the merchant to proceed with merchant processing of the customer order;

paying the merchant from the bank computer without using any customer account number or identifier which can be used to transact business using the customer account.

2. A method according to claim 1 wherein said conducting an identification inquiry between the bank computer and customer computer involves using at least one verification or authentication field which changes with each transaction.

3. A method according to claim 1 wherein said conducting an identification inquiry between the bank computer and the customer computer via the internet involves using plural verification or authentication fields at least one of which changes with each transaction conducted by the customer.

4. A method according to claim 1 and further comprising conducting an identification inquiry between the bank computer and merchant computer via the internet using at least one verification or authentication field at least one of which changes with each transaction.

5. A method according to claim 1 and further comprising conducting an identification inquiry between the bank computer and merchant computer using plural verification or authentication fields at least one of which changes with each transaction.

6. A method according to claim 1 and further comprising conducting an identification inquiry between the bank computer and merchant computer using plural verification or authentication fields, a plurality of such verification or authentication fields changing with each transaction.

7. A method according to claim 1 wherein the customer computer performs by assigning the transaction identifier.

8. A method according to claim 1 wherein the merchant computer performs by assigning the transaction identifier.

9. A method for transferring funds in connection with purchasing by a customer using o merchant having an internet site at which the merchant offers goods and/or services; and wherein a bank computer authorizes the purchase in association with a customer account and assures payment to the merchant, comprising:

communicating between a customer computer and o merchant computer via the internet and assemble order information associated with a customer order using the merchant computer and customer computer during said communicating step;

assigning a transaction identification during said communicating step to identify said transaction, said transaction identification not being useful for making other transactions against the customer account;

conducting an identification inquiry between the bank computer and customer computer via the internet to verify the authority of the customer user for using said customer account;

communicating between the customer computer and the bank computer via the internet including transaction identification and at least one order variable;

communicating between the bank computer and the merchant computer; said communicating between the bank computer and the merchant computer including said transaction identification and said at least one order variable not previously known to the merchant computer to proceed with merchant processing of the customer order;

paying the merchant using the bank.

10. A method according to claim 9 wherein said step of conducting an identification inquiry involves using at least one verification or authentication field which changes with each transaction conducted by the customer.

11. A method according to claim 9 wherein said step of conducting an identification inquiry involves using plural verification or authentication fields at least one of which changes with each transaction conducted by the customer.

12. A method according to claim 9 wherein said step of conducting an identification inquiry involves using plural verification or authentication fields a plurality of such verification or authentication fields changing with each transaction conducted by the customer.

13. A method according to claim 9 wherein said step of conducting an identification inquiry involves using at least one verification or authentication field which changes with each transaction.

14. A method according to claim 9 wherein said step of conducting an identification inquiry involves using plural verification or authentication fields at least one of which changes with each transaction.

15. A method according to claim 9 wherein said step of conducting an identification inquiry involves using plural verification or authentication fields a plurality of such verification or authentication fields changing with each transaction.

16. A method according to claim 9 and further comprising conducting an identification inquiry between the bank computer and merchant computer using at least one verification or authentication fields.

17. A method according to claim 9 and further comprising conducting an identification inquiry between the bank computer and merchant computer using plural verification or authentication fields a plurality of such verification or authentication fields changing with each transaction.

18. A method according to claim 9 wherein the customer computer performs by assigning the transaction identification.

19. A method according to claim 9 wherein the merchant computer performs by assigning the transaction identification.

20. A method according to claim 9 wherein the merchant computer and customer computer both perform in assigning the transaction identification.

* * * * *